US011739984B2

(12) United States Patent
Yang et al.

(10) Patent No.: US 11,739,984 B2
(45) Date of Patent: Aug. 29, 2023

(54) SOLAR ENERGY COLLECTION SYSTEM WITH SYMMETRIC WAVY ABSORBER PIPE

(71) Applicant: The Florida State University Research Foundation, Inc., Tallahassee, FL (US)

(72) Inventors: Sam Yang, Tallahassee, FL (US); Juan Carlos Ordonez, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 116 days.

(21) Appl. No.: 17/219,735

(22) Filed: Mar. 31, 2021

(65) Prior Publication Data
US 2021/0310699 A1    Oct. 7, 2021

Related U.S. Application Data

(60) Provisional application No. 63/002,834, filed on Mar. 31, 2020.

(51) Int. Cl.
| | | |
|---|---|---|
| F24S 10/40 | (2018.01) | |
| F24S 23/71 | (2018.01) | |
| F24S 10/75 | (2018.01) | |

(52) U.S. Cl.
CPC ............ *F24S 10/45* (2018.05); *F24S 10/755* (2018.05); *F24S 23/71* (2018.05)

(58) Field of Classification Search
CPC .................................. F24S 23/74; F24S 10/74
See application file for complete search history.

(56) References Cited

U.S. PATENT DOCUMENTS

| | | | | |
|---|---|---|---|---|
| 1,989,999 A | * | 2/1935 | Niederle ................ | F24S 20/20 126/573 |
| 3,227,153 A | * | 1/1966 | Godel ..................... | F24S 10/45 126/663 |

(Continued)

FOREIGN PATENT DOCUMENTS

| | | |
|---|---|---|
| CN | 2738167 Y | 11/2005 |
| CN | 200949937 Y | 9/2007 |

(Continued)

OTHER PUBLICATIONS

Machine translation of CN278167Y retrieved Mar. 22, 2023 (Year: 2023).*

(Continued)

*Primary Examiner* — Avinash A Savani
*Assistant Examiner* — Deepak A Deean
(74) *Attorney, Agent, or Firm* — Meunier Carlin & Curfman LLC

(57) ABSTRACT

Various implementations include solar thermal energy collection system comprising a solar energy concentrator, a heat transfer fluid, an absorber pipe. The absorber pipe includes a pipe wall and has a central longitudinal axis. The pipe wall has an inner surface and an outer surface. The inner surface has a first contour defining alternating peaks and troughs along a length of the absorber pipe. The outer surface has a second contour defining alternating peaks and troughs along the length of the absorber pipe. The inner surface defines the entire flow path for the heat transfer fluid through the absorber pipe. The first contour, as viewed through an axial cross section of the absorber pipe, forms sinusoidal waves on each side of and spaced apart from the central longitudinal axis. The sinusoidal waves on each side of the central longitudinal axis are symmetrical with respect to the central longitudinal axis.

13 Claims, 23 Drawing Sheets

(56) References Cited

U.S. PATENT DOCUMENTS

| | | | | | |
|---|---|---|---|---|---|
| 3,730,229 | A | * | 5/1973 | D'Onofrio | F28F 1/08 165/184 |
| 3,954,097 | A | * | 5/1976 | Wilson, Jr. | F24S 23/74 126/648 |
| 4,007,774 | A | * | 2/1977 | Withers, Jr. | F28F 1/42 165/184 |
| 4,085,491 | A | * | 4/1978 | Mathwig | F24S 10/75 165/184 |
| 4,134,392 | A | * | 1/1979 | Livermore | F24S 23/74 136/246 |
| 4,261,333 | A | * | 4/1981 | Guarnaschelli | F24S 20/40 392/308 |
| 4,469,088 | A | * | 9/1984 | Anzai | F24S 20/20 165/47 |
| 4,554,908 | A | * | 11/1985 | Hanlet | F24S 10/45 165/142 |
| 4,558,736 | A | * | 12/1985 | Ziemek | B21D 53/08 29/890.033 |
| 5,181,560 | A | * | 1/1993 | Burn | F28F 1/426 165/177 |
| 5,727,585 | A | * | 3/1998 | Daume | F24S 25/00 136/246 |
| 6,637,427 | B1 | * | 10/2003 | Yeomans | F24S 70/60 126/675 |
| 6,877,508 | B2 | * | 4/2005 | Litwin | F24S 40/80 126/609 |
| 7,093,619 | B2 | * | 8/2006 | Watanabe | F16L 59/065 285/47 |
| 9,624,911 | B1 | * | 4/2017 | Griffith | F24S 50/20 |
| 11,319,937 | B2 | * | 5/2022 | Arntz | F24S 80/60 |
| 2002/0005275 | A1 | * | 1/2002 | O'Donnell | F24H 9/0026 165/163 |
| 2008/0029243 | A1 | * | 2/2008 | O'Donnell | F28F 1/06 165/184 |
| 2010/0126498 | A1 | * | 5/2010 | Fleck | F28D 21/0014 165/104.19 |
| 2010/0206518 | A1 | * | 8/2010 | Patten | F28F 1/08 165/104.19 |
| 2012/0031095 | A1 | * | 2/2012 | Pedretti | F24S 23/74 126/648 |
| 2013/0152917 | A1 | * | 6/2013 | Couturier | F24S 60/10 126/674 |
| 2015/0179910 | A1 | * | 6/2015 | Al Jasem | F24S 20/70 136/201 |
| 2015/0337811 | A1 | * | 11/2015 | Chen | F22B 1/006 126/690 |
| 2018/0187925 | A1 | * | 7/2018 | Citron | F24S 20/20 |
| 2020/0018938 | A1 | * | 1/2020 | Hilliard | G02B 19/0042 |

FOREIGN PATENT DOCUMENTS

| | | |
|---|---|---|
| CN | 105066476 A | 11/2015 |
| CN | 106016780 A | 10/2016 |
| EP | 2754977 A1 | 7/2014 |
| WO | WO-2016124207 A1 * | 8/2016 |

OTHER PUBLICATIONS

Abdulhamed AJ, Adam NM, Ab-Kadir MZA, Hairuddin AA. Review of solar parabolic-trough collector geometrical and thermal analyses, performance, and applications. Renew Sustain Energy Rev 2018;91:822e31.

Bellos E, Daniil I, Tzivanidis C. Multiple cylindrical inserts for parabolic trough solar collector. Appl Therm Eng 2018;143:80e9.

Bellos E, Tzivanidis C, Antonopoulos K, Gkinis G. Thermal enhancement of solar parabolic trough collectors by using nanofluids and converging diverging absorber tube. Renew Energy 2016;94:213e22.

Bellos E, Tzivanidis C. Alternative designs of parabolic trough solar collectors. Prog Energy Combust Sci 2019;71:81e117.

Bellos E, Tzivanidis C. Investigation of a star flow insert in a parabolic trough solar collector. Appl Energy 2018;224:86e102.

Cheng Z, He Y, Cui F, Xu R, Tao Y. Numerical simulation of a parabolic trough solar collector with nonuniform solar flux conditions by coupling FVM and MCRT method. Sol Energy 2012;86(6):1770e84.

Cheng Z, He Y, Cui F. Numerical study of heat transfer enhancement by unilateral longitudinal vortex generators inside parabolic trough solar receivers. Int J Heat Mass Transf 2012;55(21e22):5631e41.

Cohen MF, Greenberg DP. The hemi-cube: a radiosity solution for complex environments. In: ACM SIGGRAPH computer graphics, vol. 19. ACM; 1985. p. 31e40.

Demagh Y, Hachicha AA, Benmoussa H, Kabar Y, et al. Numerical investigation of a novel sinusoidal tube receiver for parabolic trough technology. Appl Energy 2018;218:494e510.

Deuflhard P. A modified Newton method for the solution of ill-conditioned systems of nonlinear equations with application to multiple shooting. Numer Math 1974;22(4):289e315.

Dudley V, Kolb G, Sloan M, Kearney D. Segs ls2 solar collector test results. Report of Sandia National Laboratories; 1994. Report No. SANDIA94-1884.

Durbin PA. Separated flow computations with the k-epsilon-v-squared model. AIAA J 1995;33(4):659e64.

Errico O, Stalio E. Direct numerical simulation of turbulent forced convection in a wavy channel at low and order one Prandtl number. Int J Therm Sci 2014;86:374e86.

Fuqiang W, Qingzhi L, Huaizhi H, Jianyu T. Parabolic trough receiver with corrugated tube for improving heat transfer and thermal deformation characteristics. Appl Energy 2016;164:411e24.

Fuqiang W, Zhexiang T, Xiangtao G, Jianyu T, Huaizhi H, Bingxi L. Heat transfer performance enhancement and thermal strain restrain of tube receiver for parabolic trough solar collector by using asymmetric outward convex corrugated tube. Energy 2016;114:275e92.

Fuqiang W, Ziming C, Jianyu T, Yuan Y, Yong S, Linhua L. Progress in concentrated solar power technology with parabolic trough collector system: a comprehensive review. Renew Sustain Energy Rev 2017;79:1314e28.

Gong X, Wang F, Wang H, Tan J, Lai Q, Han H. Heat transfer enhancement analysis of tube receiver for parabolic trough solar collector with pin fin arrays inserting. Sol Energy 2017;144:185e202.

Hachicha A, Rodríguez I, Capdevila R, Oliva A. Heat transfer analysis and Fig. 16. Performance evaluation criteria as a function of fluid mass flow rate for different N and A. numerical simulation of a parabolic trough solar collector. Appl Energy 2013;111:581e92.

Huang Z, Li Z-Y, Yu G-L, Tao W-Q. Numerical investigations on fully developed mixed turbulent convection in dimpled parabolic trough receiver tubes. Appl Therm Eng 2017;114:1287e99.

Jeter SM. Calculation of the concentrated flux density distribution in parabolic trough collectors by a semifinite formulation. Sol Energy 1986;37(5):335e45.

Kays WM. Turbulent Prandtl number. Where are we? J Heat Transf 1994;116(2):284e95.

Laurence D, Uribe J, Utyuzhnikov S. A robust formulation of the v2—f model, Flow. Turbul. Combust. 2005;73(3e4):169e85.

Liu P, Zheng N, Liu Z, Liu W. Thermal-hydraulic performance and entropy generation analysis of a parabolic trough receiver with conical strip inserts. Energy Convers Manag 2019;179:30e45.

Mahian O, Kianifar A, Kalogirou SA, Pop I, Wongwises S. A review of the applications of nanofluids in solar energy. Int J Heat Mass Transf 2013;57(2):582e94.

Munoz J, Ab_anades A. Analysis of internal helically finned tubes for parabolic trough design by CFD tools. Appl Energy 2011;88(11):4139e49.

Mwesigye A, Bello-Ochende T, Meyer JP. Heat transfer and entropy generation in a parabolic trough receiver with wall-detached twisted tape inserts. Int J Therm Sci 2016;99:238e57.

Mwesigye A, Bello-Ochende T, Meyer JP. Heat transfer and thermodynamic performance of a parabolic trough receiver with centrally placed perforated plate inserts. Appl Energy 2014;136:989e1003.

Mwesigye A, Bello-Ochende T, Meyer JP. Numerical investigation of entropy generation in a parabolic trough receiver at different concentration ratios. Energy 2013;53:114e27.

Petela R. Exergy of undiluted thermal radiation. Sol Energy 2003;74(6):469e88.

(56) References Cited

OTHER PUBLICATIONS

Reddy K, Kumar KR, Ajay C. Experimental investigation of porous disc enhanced receiver for solar parabolic trough collector. Renew Energy 2015;77:308e19.

Schenk O, G€artner K. Solving unsymmetric sparse systems of linear equations with pardiso. Future Gener Comput Syst 2004;20(3):475e87.

Song X, Dong G, Gao F, Diao X, Zheng L, Zhou F. A numerical study of parabolic trough receiver with nonuniform heat flux and helical screw-tape inserts. Energy 2014;77:771e82.

Suzuki A. General theory of exergy-balance analysis and application to solar collectors. Energy 1988;13(2):153e60.

Vignarooban K, Xu X, Arvay A, Hsu K, Kannan A. Heat transfer fluids for concentrating solar power systemsea review. Appl Energy 2015;146:383e96.

Wang G, Vanka S. Convective heat transfer in periodic wavy passages. Int J Heat Mass Transf 1995;38(17):3219e30.

Wang P, Liu D, Xu C. Numerical study of heat transfer enhancement in the receiver tube of direct steam generation with parabolic trough by inserting metal foams. Appl Energy 2013;102:449e60.

Webb R. Performance evaluation criteria for use of enhanced heat transfer surfaces in heat exchanger design. Int J Heat Mass Transf 1981;24(4):715e26.

Yang S, Sensoy T, Ordonez J. Dynamic 3d volume element model of a parabolic trough solar collector for simulation and optimization. Appl Energy 2018;217:509e26.

Zhang, H. L., et al. "Concentrated solar power plants: Review and design methodology." Renewable and sustainable energy reviews 22 (2013): 466-481.

\* cited by examiner (a) Conventional

SOLAR ENERGY COLLECTION SYSTEM WITH SYMMETRIC WAVY ABSORBER PIPE

CROSS REFERENCE TO RELATED APPLICATION

This application claims priority to U.S. Provisional Patent Application No. 63/002,834, filed Mar. 31, 2020, and entitled "Solar Energy Collection System with Symmetric Wavy Absorber Pipe," the contents of which are herein incorporated by reference in their entirety.

BACKGROUND

The promising future of solar energy as a prominent alternative to fossil fuels has resulted in substantial research and development of high-efficiency parabolic trough solar collectors (PTCs) with applications in solar thermal power plants and industrial processes such as drying, sterilization, and desalination. Various approaches have been proposed to achieve desired thermal and optical characteristics of PTCs encompassing optimization and enhancement of collector geometry, optical and material properties, heat transfer fluids, and collector operation. To date, PTCs have used straight absorber pipes to collect solar energy. However, there is a need to improve the thermal performance of PTCs.

BRIEF SUMMARY

Various implementations include a solar thermal energy collection system that comprises a solar energy concentrator, a heat transfer fluid, and an absorber pipe through which the heat transfer fluid flows for absorbing concentrated solar energy incident on the absorber pipe from the solar energy concentrator. The absorber pipe comprises a pipe wall that extends about and around a central longitudinal axis that extends between each end of the absorber pipe. The pipe wall comprises an inner surface and an outer surface. The inner surface defines a first contour that defines alternating peaks and troughs along a length of the absorber pipe, and the outer surface defines a second contour that defines alternating peaks and troughs along the length of the absorber pipe. The inner surface defines the entire flow path for the heat transfer fluid through the absorber pipe. The first contour, as viewed through an axial cross section of the absorber pipe, forms sinusoidal waves on each side of and spaced apart from the central longitudinal axis. The sinusoidal waves on each side of the central longitudinal axis are symmetrical with respect to the central longitudinal axis, and at least a portion of the absorber pipe is disposed along a focal line of the solar energy concentrator.

In some implementations, the second contour, as viewed through the axial cross section of the absorber pipe, forms sinusoidal waves on each side of and spaced apart from the central longitudinal axis. The sinusoidal waves of the second contour on each side of the central longitudinal axis are symmetrical with respect to the central longitudinal axis.

In some implementations, the pipe wall has a maximum radius as measured between the inner surface and the central longitudinal axis at each peak and a minimum radius as measured between the inner surface and the central longitudinal axis at each trough.

In some implementations, the outer surface of the pipe wall has a second maximum radius as measured between the outer surface and the central longitudinal axis at each peak and a second minimum radius as measured between the outer surface and the central longitudinal axis at each trough.

In some implementations, the peaks and troughs of the inner surface are radially aligned with the peaks and troughs of the outer surface.

In some implementations, a thickness between the inner surface and the outer surface of the wall is constant along the length of the wall.

In some implementations, the inner surface is shaped to induce a plurality of turbulent fluid flow regions along the length of the central longitudinal axis.

In some implementations, troughs of the second contour define areas of concentrated solar energy.

In some implementations, the solar thermal energy collection system is a parabolic trough solar energy absorber system. The solar energy concentrator comprises a parabolic reflector having a focal axis that is parallel to a central longitudinal axis of the parabolic reflector and is spaced apart a focal length from a vertex of the parabolic reflector. The parabolic trough solar energy absorber system further comprises a tube into which the absorber pipe is disposed. The outer surface of the absorber pipe is spaced apart from an inner surface of the tube, and a wall of the tube allows for the transmission of radiant energy therethrough. The tube is coupled to the parabolic reflector such that the central longitudinal axis of the absorber pipe is coincident with the focal axis.

In some implementations, a vacuum condition is maintained between the outer surface of the absorber pipe and the inner surface of the tube.

In some implementations, the solar thermal energy collection system further comprises a heat transfer fluid tube coupled to an entry end and an exit end of the absorber pipe. The heat transfer fluid tube and the absorber pipe form a closed loop through which the heat transfer fluid flows.

In some implementations, the system further comprises a heat exchanger, wherein at least a portion of the heat transfer fluid tube is disposed inside the heat exchanger.

In some implementations, the heat exchanger is a boiler tank.

In some implementations, the system further comprises a fluid pump coupled to the heat transfer fluid tube, and the fluid pump causes the heat transfer fluid to flow through the heat transfer fluid tube and the absorber pipe.

BRIEF DESCRIPTION OF THE DRAWINGS

Example features and implementations are disclosed in the accompanying drawings. However, the present disclosure is not limited to the precise arrangements and instrumentalities shown. Similar elements in different implementations are designated using the same reference numerals.

DETAILED DESCRIPTION

Figure 1A:
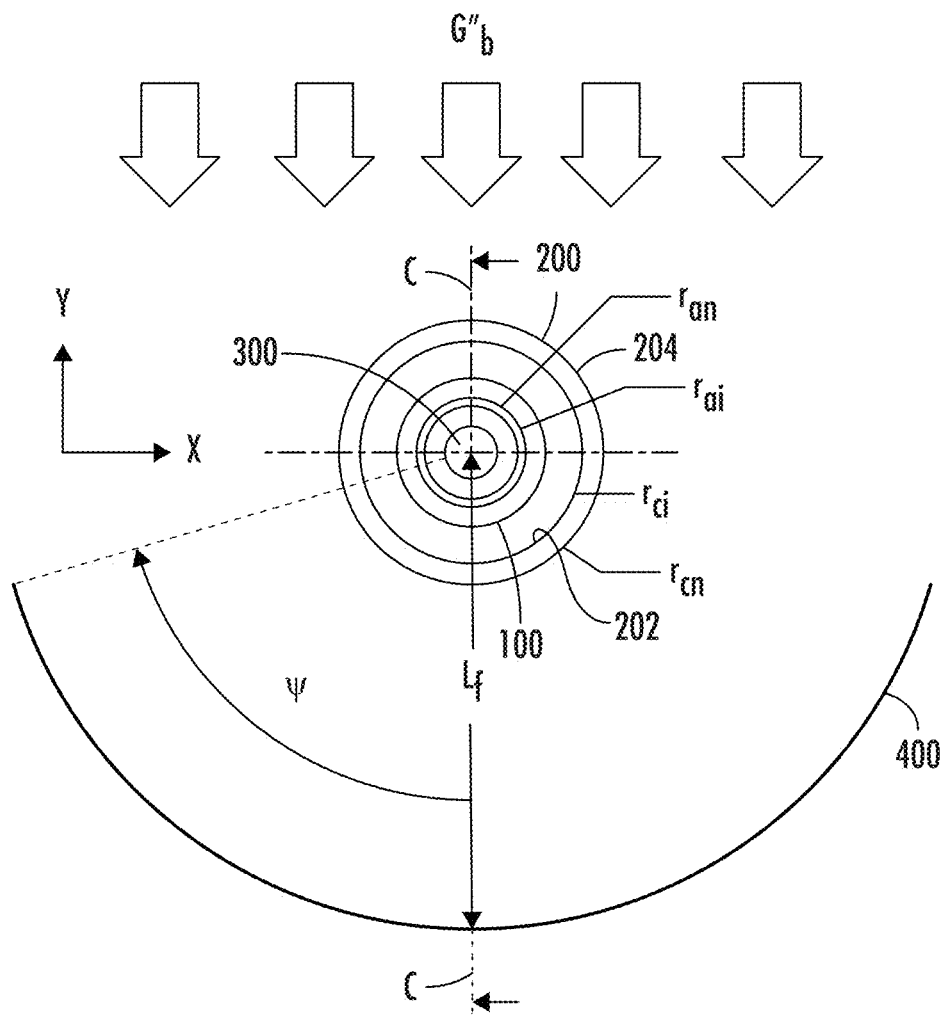
FIG. 1A shows an end view of a schematic diagram of a parabolic trough solar energy collector system comprising an absorber pipe according to one implementation.

Various implementations include a solar thermal energy collection system comprising a solar energy concentrator, a heat transfer fluid, and an absorber pipe through which the heat transfer fluid flows for absorbing concentrated solar energy incident on the absorber pipe from the solar energy concentrator. The absorber pipe includes a pipe wall. The pipe wall of the absorber pipe extends along and about a central longitudinal axis extending through each end of the absorber pipe. The pipe wall has an inner surface and an outer surface. The inner surface has a first contour defining alternating peaks and troughs along a length of the absorber pipe. The outer surface has a second contour defining alternating peaks and troughs along the length of the absorber pipe. The inner surface defines the entire flow path for the heat transfer fluid through the absorber pipe. The first contour, as viewed through an axial cross section of the absorber pipe, forms sinusoidal waves on each side of and spaced apart from the central longitudinal axis. The sinusoidal waves on each side of the central longitudinal axis are symmetrical with respect to the central longitudinal axis. At least a portion of the absorber pipe is disposed along a focal axis of the solar energy concentrator. In some implementations, the absorber pipe enhances thermal performance of the system by accelerating the heat transfer fluid across the trough portions of the first contour of the absorber pipe (or pipe throats), where most solar radiation incident on the absorber pipe is concentrated.

In various implementations, the absorber pipe may be used for enhancing heat transfer in the heat transfer fluid flowing through the absorber pipe in the solar thermal energy collection system when the absorber pipe receives concentrated heat flux along a focal axis of the solar energy concentrator. Examples of solar energy concentrators include parabolic trough solar energy absorber systems, solar tower receivers, solar dish receivers, or any system comprising a heat exchanger that is subject to concentrated heat flux along a focal line.

For example, in certain implementations, the solar thermal energy collection system is a parabolic trough solar energy absorber system. The solar energy concentrator comprises a parabolic reflector that has a focal axis that is parallel to a central longitudinal axis of the parabolic reflector and is spaced apart a focal length from a vertex of the parabolic reflector. The solar thermal energy collection system also includes a tube into which the absorber pipe is disposed. The outer surface of the absorber pipe is spaced apart from an inner surface of the tube, and a wall of the tube allows for the transmission of radiant energy therethrough. The tube is coupled to the parabolic reflector such that the central longitudinal axis of the absorber pipe is coincident with the focal axis.

In some implementations, the absorber pipe described herein provides significant improvement in first law efficiency ($\eta_c$), especially at mass flow rates ($\dot{m}_f$) of 5 kg/s and greater due to the accelerated flow through the pipe throat portions, which in turn enhances the mixing and heat transfer between the absorber pipe and the heat transfer fluid. In addition, in some implementations, the second law efficiency ($\eta_{ex}$) variations shift from an increasing to a decreasing trend with respect to amplitude (A) as mass flow rate ($\dot{m}_f$) increases and the exergy destroyed due to pressure drop becomes evident. Furthermore, in some implementations, the absorber pipe performs better than the conventional straight absorber pipe as its peak performance evaluation criteria (PEC) approaches 1.25 despite its increased pressure drop across the pipe. However, the performance of the absorber pipe is not an improvement (PEC≤1) for all number of waves, or peaks (N), and mass flow rate ($\dot{m}_f$) when the amplitude A>0.006 m due to an escalated pressure drop that overturns the heat transfer enhancement. Thus, as the number of peaks and amplitude decrease, the heat transfer performance increases while diminishing the effect of pressure drop as compared to the conventional straight absorber pipe.

Figure 1B:
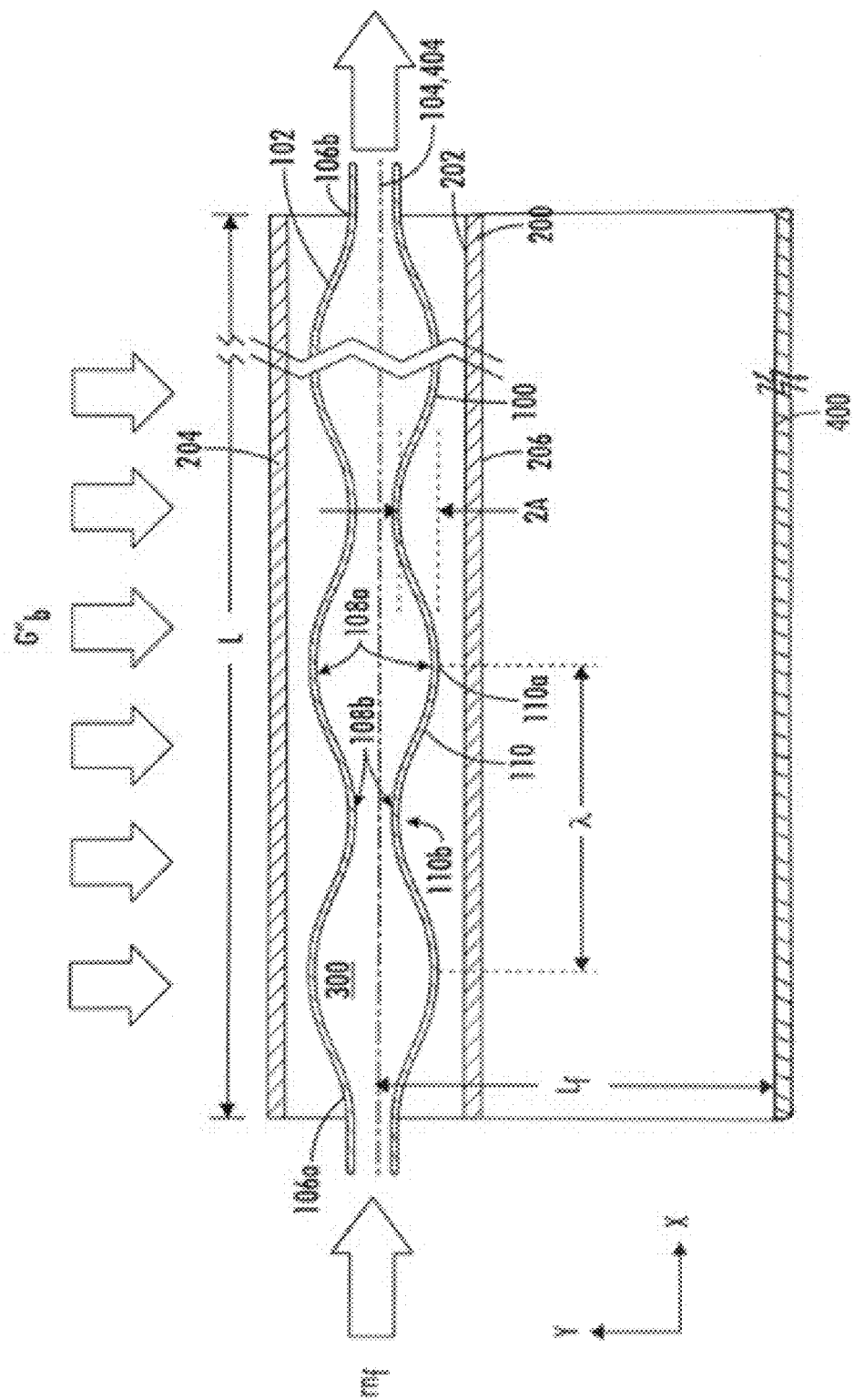
FIG. 1B shows an axial cross-sectional view along the C-C line of the parabolic trough solar energy collector system comprising the absorber pipe shown in FIG. 1A.

For example, FIG. 1A shows a solar thermal energy concentration system 10 that includes an absorber pipe 100, a tube 200 into which the absorber pipe 100 is disposed, a heat transfer fluid 300, and a parabolic reflector 400, according to one implementation. FIG. 1B illustrates an axial cross-sectional view of the system 10 as taken through the C-C line shown in FIG. 1A.

The absorber pipe 100 in FIG. 1B includes a pipe wall 102. The pipe wall 102 of the absorber pipe 100 extends along and about a central longitudinal axis 104 extending through each end 106a, 106b of the absorber pipe 100. The pipe wall 102 has an inner surface 108 and an outer surface 110. The inner surface 108 has a first contour defining alternating peaks 108a and troughs 108b along a length L of the absorber pipe 100. The outer surface 110 has a second contour defining alternating peaks 110a and troughs 110b along the length L of the absorber pipe 100. The inner surface 108 defines the entire flow path for the heat transfer fluid 300 through the absorber pipe 100. The first contour of the inner surface 108, as viewed through the axial cross section of the absorber pipe 100, forms sinusoidal waves on each side of and spaced apart from the central longitudinal axis 104. The axial cross section refers to the cross section of the absorber pipe 100 as taken in a plane that includes the central longitudinal axis. The sinusoidal waves on each side of the central longitudinal axis 104 are symmetrical with respect to the central longitudinal axis 104. In addition, the second contour of the outer surface 110 of the absorber pipe 100, as viewed through the axial cross section of the absorber pipe 100, forms sinusoidal waves on each side of and spaced apart from the central longitudinal axis 104. The sinusoidal waves of the second contour of the outer surface 110 on each side of the central longitudinal axis 104 are symmetrical with respect to the central longitudinal axis 104.

The pipe wall 102 has a maximum radius $R_{max108}$ as measured between the inner surface 108 and the central longitudinal axis 104 at each peak 108a and a minimum radius $R_{min108}$ as measured between the inner surface 108 and the central longitudinal axis 104 at each trough 108b. The peaks 108a of the inner surface 108 are radially aligned and opposite each other with respect to the central longitudinal axis 104 of the absorber pipe 100, and the troughs 108b of the inner surface 108 are radially aligned and opposite each other with respect to the central longitudinal axis 104 of the absorber pipe 100.

The outer surface 110 of the pipe wall 102 has a second maximum radius $R_{max110}$ as measured between the outer surface 110 and the central longitudinal axis 104 at each peak 110a and a second minimum radius $R_{min110}$ as measured between the outer surface 110 and the central longitudinal axis 104 at each trough 110b. The peaks 110a of the outer surface 110 are radially aligned and opposite each other with respect to the central longitudinal axis 104 of the absorber pipe 100, and the troughs 110b of the outer surface 110 are radially aligned and opposite each other with respect to the central longitudinal axis 104 of the absorber pipe 100.

The peaks 108a and troughs 108b of the inner surface 108 are also radially aligned with the peaks 110a and troughs 110b of the outer surface 110. In addition, a thickness between the inner surface 108 and the outer surface 110 of the pipe wall 102 is constant along the length L of the pipe wall 102. The first contour of the inner surface 108 is shaped to induce a plurality of turbulent fluid flow regions along the length L of the central longitudinal axis 104. And, the troughs 110b of the second contour of the outer surface 110 define areas of concentrated solar energy. In particular, the portions of the contour of the outer surface 110 that define the troughs emit a small amount of heat back toward themselves via radiative heat transfer due to the nature of sinusoidal waves.

In FIGS. 1A and 1i, A, $\dot{G}''_b$, L, $L_f$, $\dot{m}_f$, and r are amplitude, beam irradiance, absorber pipe length, focal length, fluid mass flow rate, and radius, respectively. $\lambda$ and $\psi$ denote periodicity length and rim angle, whereas the subscripts ai, ao, ci, and co refer to the inner surface 108 of the absorber pipe 100, the outer surface 110 of the absorber pipe 100, the inner surface 202 of the tube 200, and an outer surface 206 of the tube 200, respectively. The first and second contours of the inner and outer surfaces 108, 110 of the absorber pipe 100 is defined by the sinusoidal wavy curve given as $$f(z) = A\sin\left(\frac{2\pi}{\lambda}z - \frac{\pi}{2}\right), \tag{1}$$

where $\lambda$ is defined as the ratio of L and the total number of waves N and z is the axial length.

In some implementations, a ratio of the maximum radius $R_{max108}$ to the minimum radius $R_{min108}$ is at least 6:1 in some implementations. And, a ratio of the maximum radius $R_{max110}$ to the minimum radius $R_{min110}$ is at least 6:1 in some implementations.

The outer surface 110 of the absorber pipe 100 is spaced apart from an inner surface 202 of the tube 200, and a wall 204 of the tube 200 allows for the transmission of radiant energy therethrough. The tube 200 may include known tubes into which conventional straight absorber pipes are disposed, for example. The absorber pipe 100 is coupled within the tube 200 via one or more brackets that extend between the inner surface 202 of the tube 200 and the outer surface 110 of the absorber pipe 100. The brackets may be known brackets currently used to couple conventional straight absorber pipes within tubes. The parabolic reflector 400 has a focal axis 404 that is parallel to (e.g., coincident with) a central longitudinal axis of the parabolic reflector 400 and is spaced apart a focal length $L_f$ from a vertex of the parabolic reflector 400. The heat transfer fluid 300 is disposed within the absorber pipe 100. The tube 200 is coupled to the parabolic reflector 400 such that the central longitudinal axis 104 of the absorber pipe 100 is coincident with the focal axis 404. For example, in some implementations, the tube is coupled to the parabolic reflector with brackets that extend between the tube and the reflector. Adjacent brackets are spaced apart from each other along the length of the tube. The brackets may be known brackets currently used to couple conventional tubes to reflectors. And, the parabolic reflector may be any known parabolic reflector.

In addition, a vacuum condition is maintained between the outer surface 110 of the absorber pipe 100 and the inner surface 202 of the tube 200. The vacuum condition is a condition in which the pressure is sufficiently low such that any convection through the annulus is negligible at the expected temperatures.

Figure 1C:
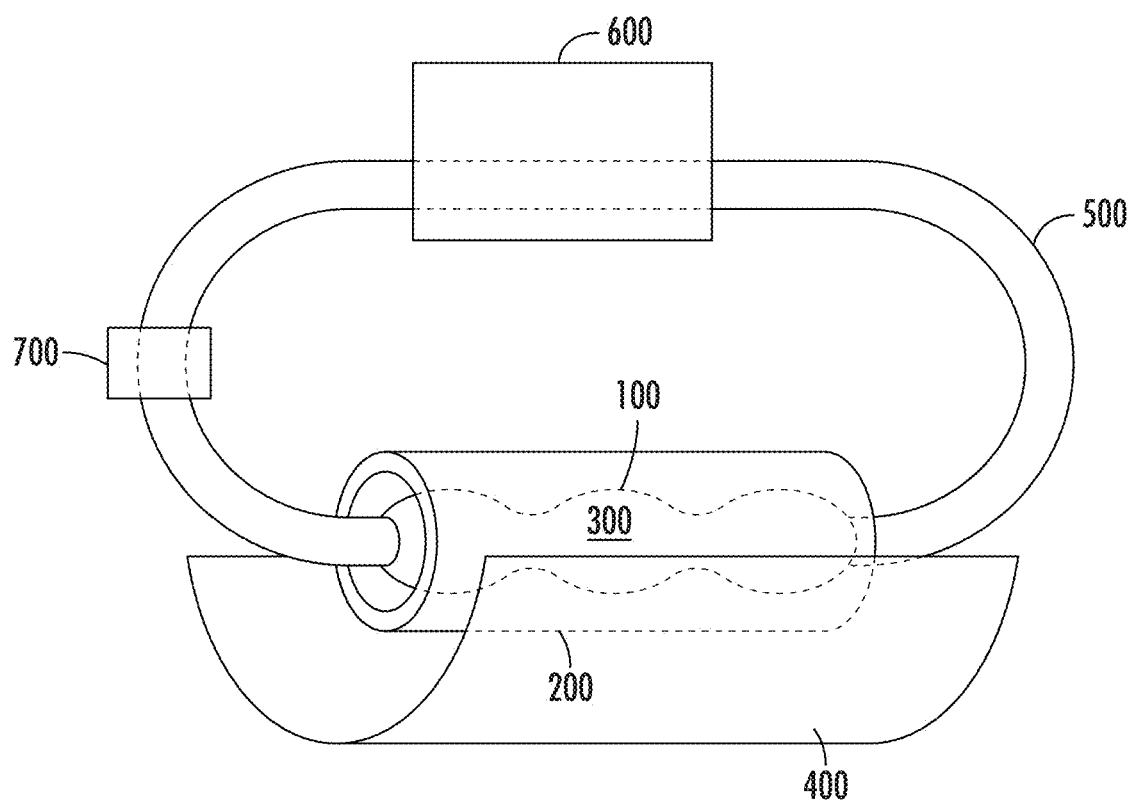
FIG. 1C shows a schematic diagram of the system shown in FIG. 1A.

As shown in FIG. 1C, the system 10 also includes a heat transfer fluid tube 500 coupled to the entry end 106a and the exit end 106b of the absorber pipe 100 such that the heat transfer fluid tube 500 and the absorber pipe 100 form a closed loop. The system 10 also includes a heat exchanger 600. For example, the heat exchanger is a boiler tank in one implementation. At least a portion of the heat transfer fluid tube 500 is disposed inside the heat exchanger 600. In addition, the system 10 includes a fluid pump 700 coupled to the heat transfer fluid tube 500. The fluid pump 700 causes the heat transfer fluid 300 to flow through the heat transfer fluid tube 500 and the absorber pipe 100.

Figure 2A:
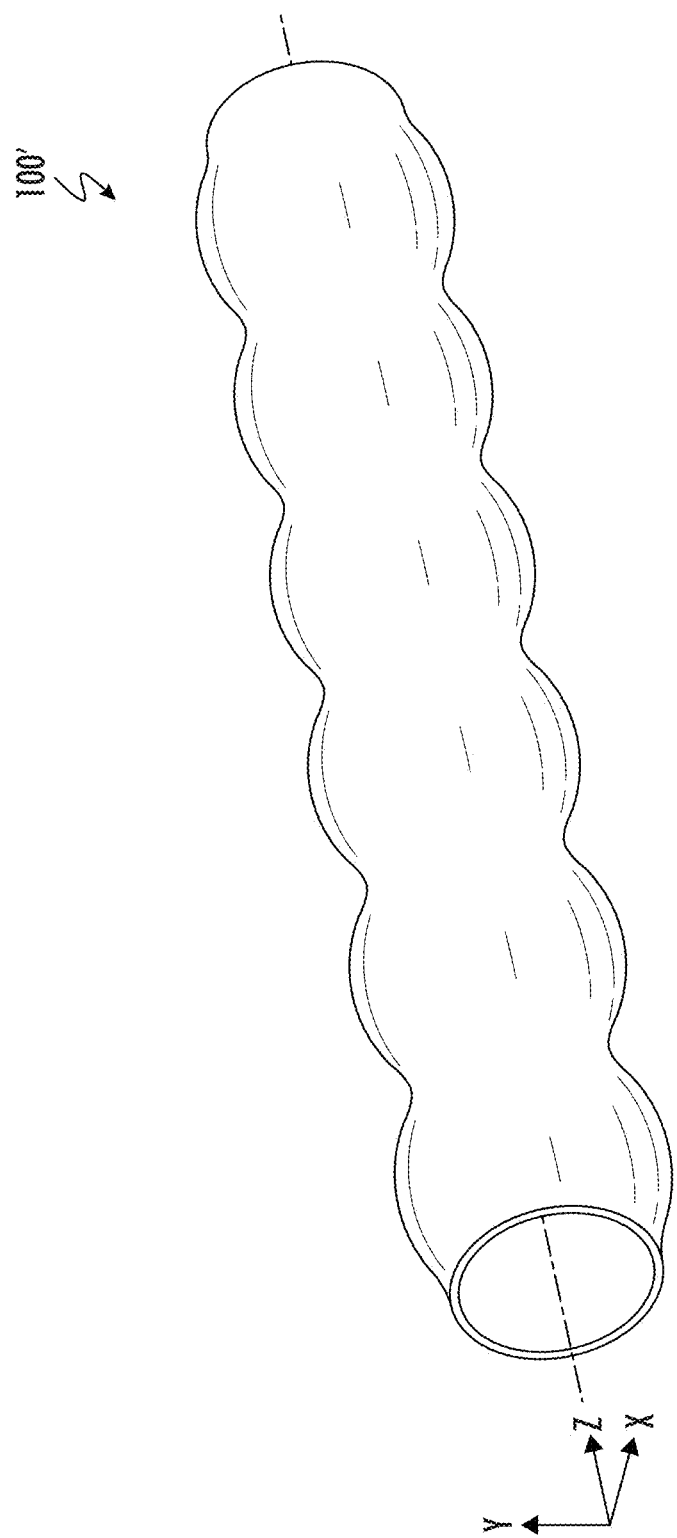
FIG. 2A shows a perspective view of an absorber pipe according to another implementation. The absorber pipe shown in FIG. 2A is similar to the absorber pipe shown in FIG. 1A but has six peaks.
Figure 2B:
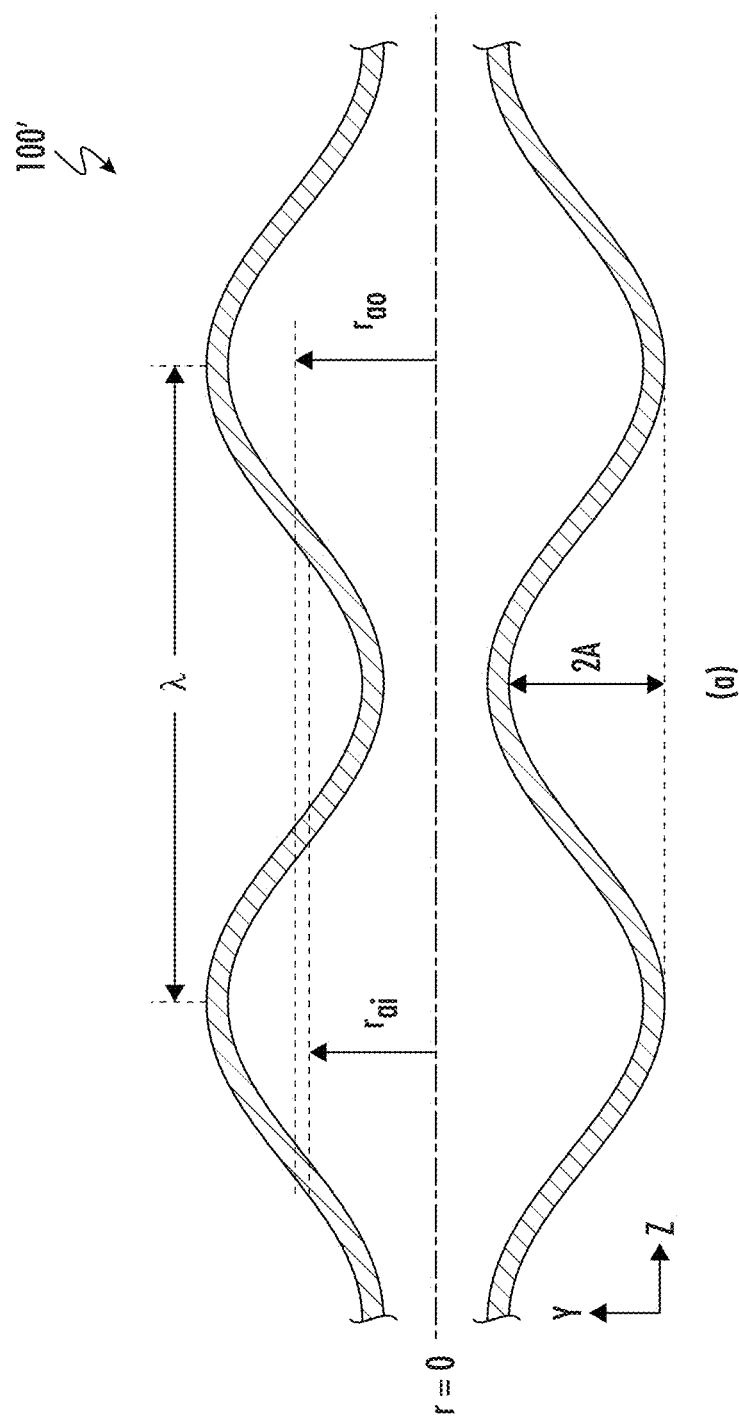
FIG. 2B shows a partial axial cross-sectional view of the absorber pipe shown in FIG. 2A.

FIG. 2A shows an absorber pipe 100' according to another implementation. The absorber pipe 100' has the same periodicity and amplitude as the absorber pipe 100 except that the absorber pipe 100' has six peaks instead of the three peaks and is longer. FIG. 2B is a partial axial cross-sectional view of the absorber pipe 100'. In other implementations, the absorber pipe may have two or more peaks and one or more troughs.

In some implementations, the heat transfer fluid 300 is a liquid that has high thermal conductivity, low viscosity, and a high boiling point. For example, suitable heat transfer fluids include synthetic oils, such as silicone-based oils (e.g., SYLTHERM™ 800), mixtures of diphenyl oxide and biphenyl (e.g., THERMINOL® VP-1), or mixtures of diphenylethane and alkylated aromatics (e.g., DOWTHERM™ Q), and molten salt(s). The heat transfer fluid 300 used with this system may include any other known heat transfer fluid typically used with conventional straight absorber pipes.

In some implementations, the absorber pipes 100, 100' are formed from non-corrosive materials having a high thermal conductivity such as that of nickel-based alloys or stainless steel, e.g., 20 W/m K. In some implementations, copper is used as a foil or thin sublayer in between stainless steel and/or nickel-based alloys to prevent corrosion. For example, suitable materials may include Ni-NiOx/Cu—Ni, CrN-CrxOy, TiNxOy, Ni/NiOx, Ag/Alumina, SS/Alumina, Cu/Alumina, and Ti/Silica. A foil is deposited on the outer surface of the absorber pipes 100, 100' for increasing solar energy absorption. The foil may include a suitable metal for increasing absorption by the pipe, such as Al, Cu, or SS. And, deposition methods for the foil may include sputtering and/or evaporation. The chart below provides examples of combinations of materials used for the absorber pipe and the foil along with deposition methods for the foil and the percentage of solar radiation absorbed by the pipe for the particular example combination.

| Absorber Materials | Foil | Deposition Method | Absorption |
| --- | --- | --- | --- |
| Ni-NiOx/Cu-Ni | Al | Sputtering | 95% |
| CrN-CrxOy | Cu | Sputtering | 93% |
| TiNxOy | Cu | Evaporation | 95% |
| Cu-Cr-C | Cu | Sputtering | 93% |
| Ni/NiOx | Al | Sputtering | 95% |
| Ag/Alumina | Al | Sputtering/Evaporation | 95% |
| SS/Alumina | SS | Sputtering | 94% |
| Cu/Alumina | Cu | Sputtering | 93% |
| Ti/silica | Al | Sputtering | 95% |

Models of the absorber pipes 100, 100' shown in FIGS. 1A and 2B and other absorber pipe models comprising varying numbers of peaks and amplitudes were analyzed using an experimentally validated 3D finite element method (FEM) coupled to a semi-analytical optical model. The absorber pipe models were assessed based on the first and second law efficiency as well as the performance evaluation criteria (PEC), which accounted for both heat transfer enhancement and pressure drop relative to a conventional straight absorber pipe design, as the wave amplitude, periodicity length, and fluid mass flow rate were varied.

EXAMPLE MODEL IMPLEMENTATION AND RESULTS

The following assumptions were made to simplify the modeling without losing significant accuracy:

1. The computational domain was symmetric about the vertical centerline in the x-y (or r-θ) plane, hence only half of the absorber system was modeled and simulated.
2. The annulus between the absorber pipe 100 or 100' and the tube 200 was in perfect vacuum—the convection was therefore neglected and the annulus was not included in the computational domain. In an actual system, the vacuum condition is a condition in which the pressure is sufficiently low such that any convection through the annulus is negligible at the expected temperatures.
3. Radiation in participating media was neglected; instead, constant optical properties and tracking errors were assumed to compute the concentrated solar radiation reaching the absorber pipe and tube surfaces.
4. Adiabatic absorber pipe ends and negligible conduction through the support bracket.

In addition, for modeling purposes, the absorber pipe boundary was shifted vertically by $r_{ai}$ and $r_{ao}$ (see FIG. 2B) to ensure the mean solar concentration is the same as that on a conventional straight absorber pipe.

The optical analysis aims to maximize the solar concentration ratio and minimize the errors associated with the tracking, geometric configurations, and operation. In this work, the optical component of the PTC was modeled by adapting an optical model based on the semi-finite formulation. Consequently, the concentrated heat flux distribution around the receiver was obtained quickly given the PTC geometry, optical properties, and incidence angle. Furthermore, the optical model has served as a reliable reference to verify several Monte Carlo Ray Tracing models proposed afterwards. The optical model is summarized herein for congruity and transparency of this study.

The distribution of concentrated heat flux ($\dot{Q}_r''$) around the receiver is given by $$\dot{G}_s'' = \int_{-\psi_m}^{\psi_m} \left(\frac{2\dot{G}_b''}{\pi \sin s}\right) \frac{u_{yz} \cos(\psi/2 - \delta_{yz}) \cos\phi_0}{\rho_{yz} \cos(\psi/2) \cos\delta_0} \times \left[1 - \frac{\sin^2\delta_0}{\sin^2 s}\right]^{1/2} \cos\theta_0 d\psi \quad (2)$$

for $\delta_0 \leq s$, where $\dot{G}_b''$ and s are direct normal irradiance and angular radius of the sun, respectively; $u_{yz}$ is the projected path length of the reflected central ray; $\psi$ is the azimuth; $\delta_{yz}$ and $\delta_0$ are the projected skewness angle and its minimum value, respectively; $\phi_0 = \tan^{-1}(\tan\theta_i/\cos\delta_{yz})$ and $\theta_i$ is the incidence angle; and $\rho_{yz}$ is the reflected ray length. Note that $\dot{G}_s'' = 0$ for $\delta_0 > s$.

The absorber pipe partially shades the reflector, thus the incoming sun ray is blocked by the receiver when $$d = u_{yz} \sin(\psi - \delta_{yz}) \leq r_{ao}, \quad (3)$$

In such cases, the incoming rays strike the tube and absorber tube top surfaces and the irradiance is computed as $$\dot{G}_s'' = \dot{G}_b'' \cos\theta_i \cos(\pi - \beta). \quad (4)$$

where β is the receiver azimuthal angle. Eq. (2) was solved numerically along with the shadowing condition in Eq. (3)

using QUADPACK. The limits of integration and integrand were modified to account for the shadowing effect.

Figure 3A:
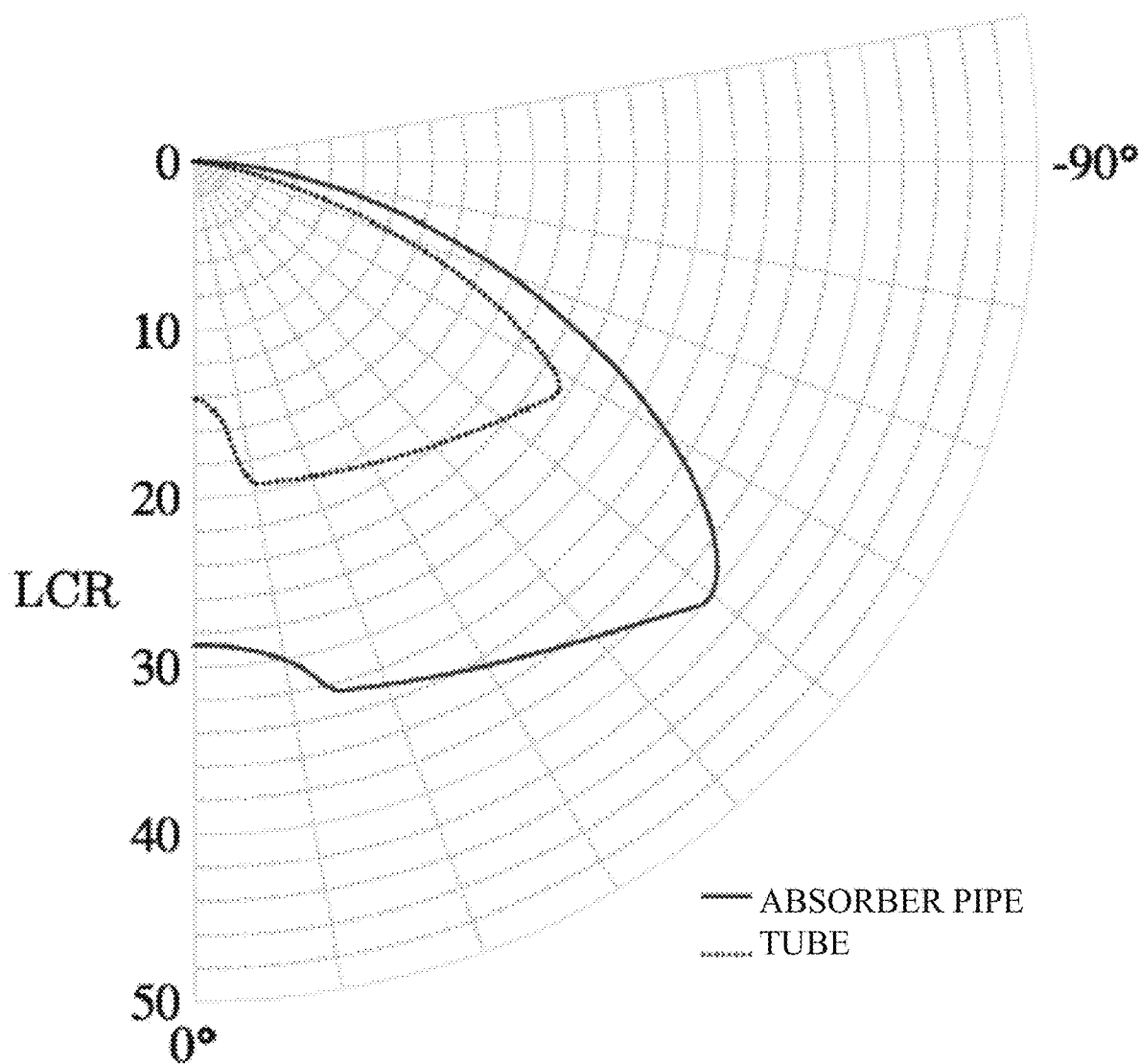
FIG. 3A shows a local concentration ratio around a quarter of a conventional straight absorber pipe.
Figure 3B:
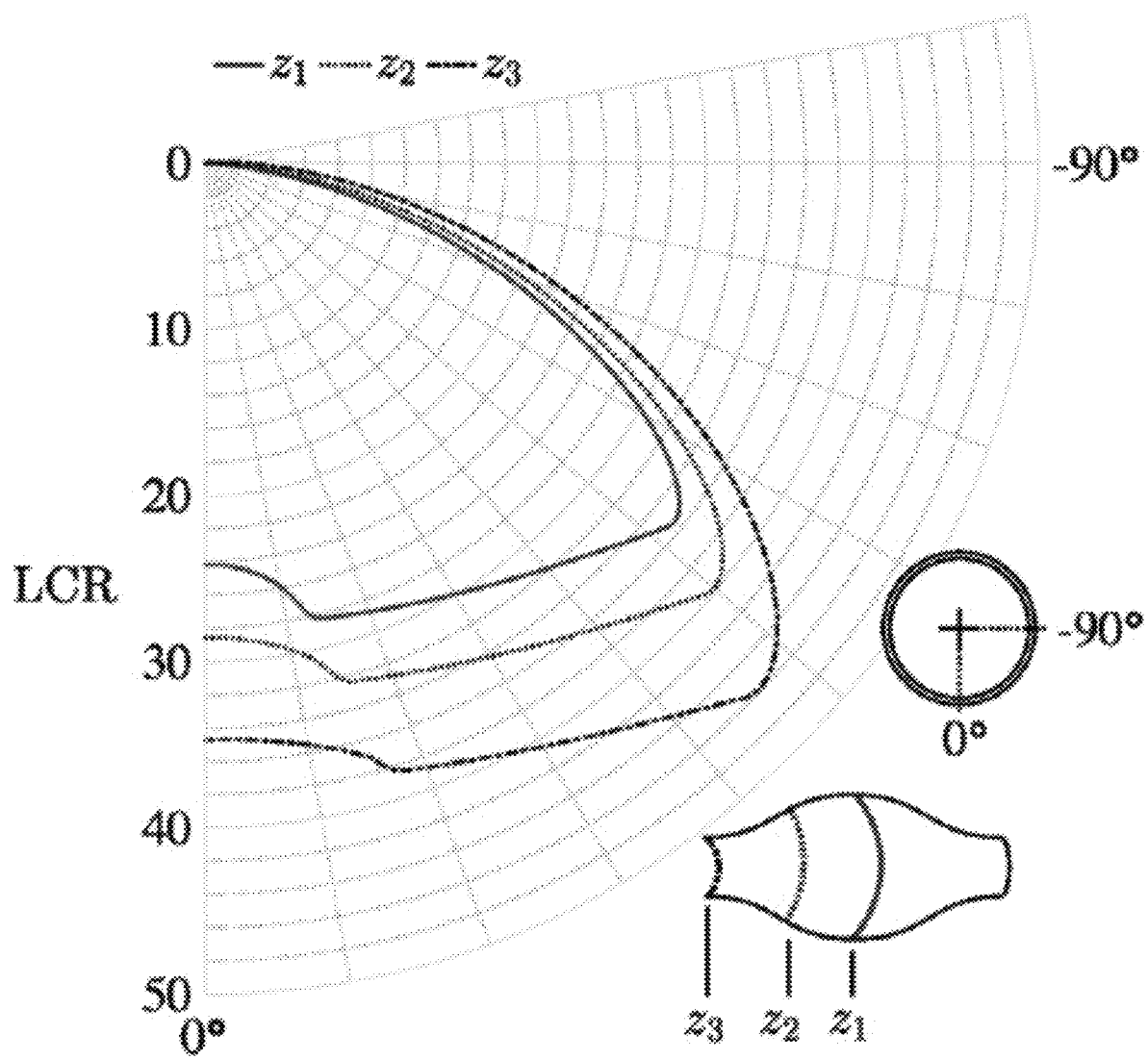
FIG. 3B shows a local concentration ratio around a quarter of the absorber pipe, such as the absorber pipes shown in FIG. 1B or 2A.
Figure 4:
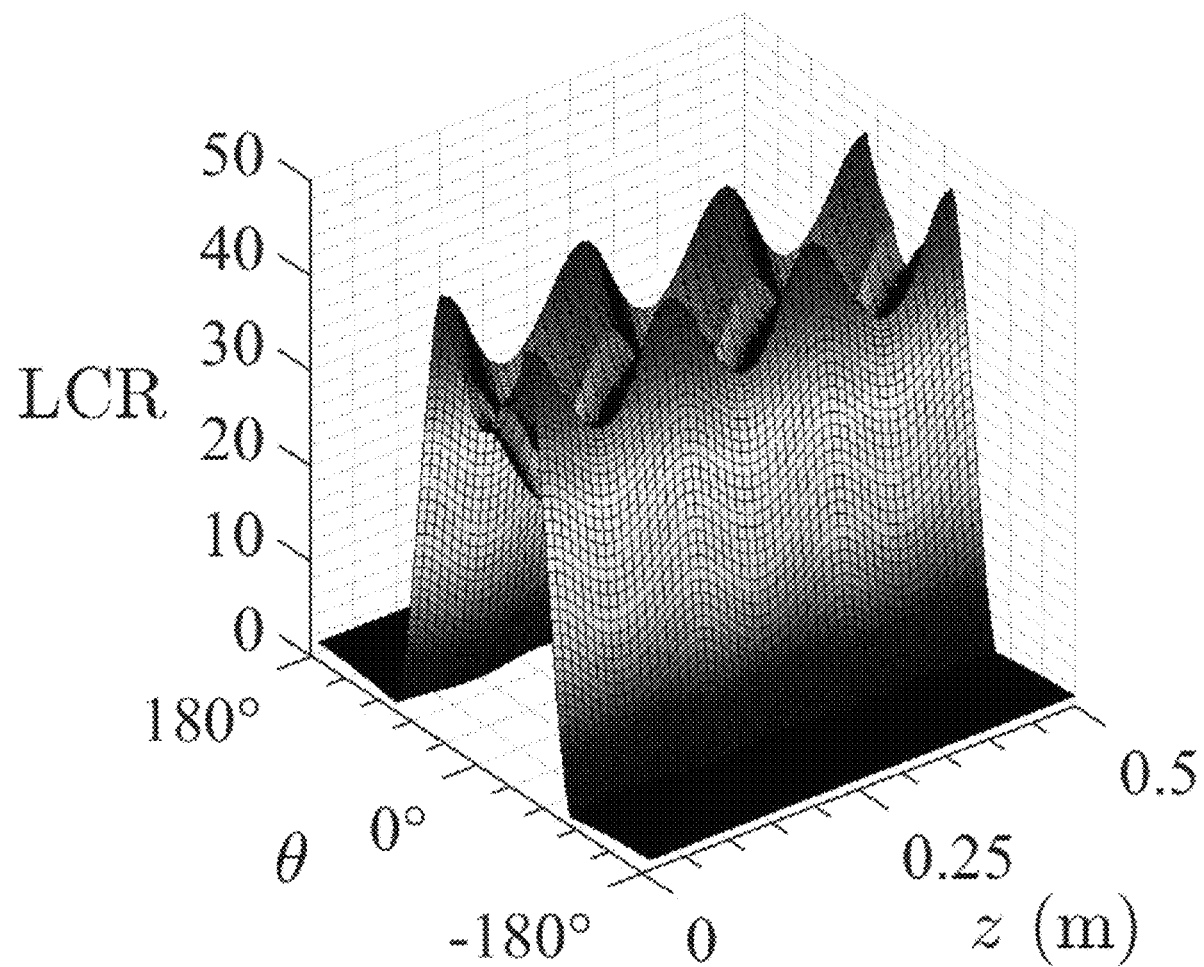
FIG. 4 shows a local concentration ratio profile around the absorber pipe in FIG. 1B.

The semi-analytical model described above was modified to account for the curvature of the symmetric wavy absorber pipe, such as the pipes shown in FIGS. 1B and 2A, in the axial direction. Subsequently, Eq. (2) was solved as a function of z and the resulting local concentration ratio (LCR) around the absorber pipe is displayed in FIG. 3B, along with the LCR for a conventional straight absorber pipe in FIG. 3A as a comparison. The LCR is the ratio between concentrated solar energy around an absorber and total direct beam solar radiation. The LCR is defined as $LCR=\dot{G}''_s/\dot{G}''_b$, and only a quarter of the absorber pipe is featured in FIGS. 3A and 3B due to the symmetry about the vertical centerline. The LCR around the tube 200 in FIGS. 3A and 3B remains fixed as long as its geometry does not change. FIG. 3B depicts the LCR at three different axial lengths ($z_1$, $z_2$, and $z_3$) illustrated in the diagram next to the plot. In both cases, the heat flux is lower when $\beta=0$ owing to the shade created by the absorber pipe, and the LCR eventually becomes relatively small as $\beta$ decreases since only the direct beam on the receiver top persists. FIG. 4 also depicts the LCR profile around the outer surface of the absorber pipe surface of FIG. 1B in which the number of waves, or peaks, is three, as an example. FIG. 4 shows a continuous transition in the LCR between two peaks, and FIG. 3B depicts the distribution at three representative cross sections. FIG. 4 is a 3D distribution whereas FIG. 3B is a 2D distribution.

The model was formulated based on mass, momentum and energy conservation laws given in the Cartesian tensor notation as $$\frac{\partial u_i}{\partial x_i} = 0, \tag{5}$$

$$\frac{\partial}{\partial x_j}(\rho u_i u_j) = -\frac{\partial p}{\partial x_i} + \frac{\partial}{\partial x_j}\left\{(\mu+\mu_t)\left[\left(\frac{\partial u_i}{\partial x_j}+\frac{\partial u_j}{\partial x_i}\right)-\frac{2}{3}\frac{\partial u_k}{\partial x_k}\right]\right\}, \tag{6}$$

and $$\frac{\partial}{\partial x_j}(\rho u_i c_p T) = \frac{\partial}{\partial x_i}\left[\left(k+\frac{c_p \mu_T}{Pr_T}\right)\frac{\partial T}{\partial x_i}\right] + S_T, \tag{7}$$

where u, p, $\mu$, $\rho$, $c_p$, T, and Pr are velocity, pressure, dynamic viscosity, density, specific heat at constant pressure, temperature, and Prandtl number, respectively. The source term in Eq. (7), $S_T$, is zero in the solid domain while $$S_T = \frac{T}{\rho_f}\left(\frac{\partial \rho_f}{\partial T}\right)_p\left[\frac{\partial}{\partial x_j}(u_i p)\right] + \tau_{ij}\frac{\partial u_i}{\partial x_j} \tag{8}$$

in the fluid domain accounting for the work done by pressure changes and viscous dissipation, respectively. $\tau$ in Eq. (8) is the viscous stress tensor.

The term in the parenthesis in Eq. (7) represents the conductive heat flux in Reynolds-averaged Navier-Stokes whose $Pr_T$ is computed using Kays-Crawford heat transport turbulence model. In this model, $\overline{v^2}$-f model is employed to solve the turbulent flow from which $\mu_T$ results. $\overline{v^2}$-f model is similar to the standard k-$\varepsilon$ model, but describes the anisotropy of the turbulence intensity in the turbulent boundary layer and non-local pressure-strain effects using two new equations in addition to the two equations for turbulence kinetic energy (k) and dissipation rate ($\varepsilon$). The model has been demonstrated to outperform other turbulence models especially since it does not use wall functions.

The boundary condition imposed at the outer surface of the tube is the sum of radiative and convective heat flux given by $$-k_c\frac{\partial T}{\partial n}\Big|_{co} = \varepsilon_c\sigma(T_{sky}^4 - T^4) + h_0(T_0 - T) + \dot{G}''_{s,CO}, \tag{9}$$

where $\varepsilon_c$ and $\sigma$ are the tube emittance and Stefan-Boltzmann constant, respectively; $T_{sky}=T_0-8$ in which $T_0$ is the ambient temperature; and $\dot{G}''_{s,co}$ is the local concentrated irradiance discussed later. The convective heat transfer coefficient is computed as $$\overline{h}_0 = \frac{k_c}{2r_{co}}\left\{0.3 + \frac{0.62Re_D^{1/2}Pr^{1/3}}{\left(1+\left(\frac{0.4}{Pr}\right)^{2/3}\right)^{1/4}}\left[1+\left(\frac{Re_D}{282\times 10^3}\right)^{5/8}\right]^{4/5}\right\}, \tag{10}$$

which is an averaged heat transfer correlation applied to forced convection on a cylinder in cross flow.

Only radiation through the annulus (i.e., between absorber pipe and tube) is considered as mentioned earlier. Hence the inner tube boundary is defined as the following:

$$-k_c\frac{\partial T}{\partial n}\Big|_{ci} = \dot{G}''_{ci} - J_{ci}, \tag{11}$$

where radiosity J is given by $$J_{ci} = \rho_c \dot{G}''_{ci} - \varepsilon_c \sigma T^4. \tag{12}$$

Here $\rho_c$ is the tube reflectance and $\dot{G}''_{ci}$ is the mutual irradiance between a point along the inner tube surface $P_{ci}$ and that on the outer surface of the absorber pipe $P_{ao}$, and it can be expressed as $$\dot{G}''_{ci} = \alpha_c \int_{S_{ao}} \frac{(-n_a\cdot r)(n_c\cdot r)}{\pi|r|^4} J_{ao} dS, \tag{13}$$

in which $a_c$ is the tube absorptance; $n_c$ and $n_a$ are normal vectors from $P_{ci}$ and $P_{ao}$; r is the distance between the two points; and $J_{ao}$ is the radiosity of the outer surface of the absorber pipe $S_{ao}$. The integral (view factor) is evaluated by the hemicube method. Eq. (11) is imposed as the outer boundary condition of the absorber pipe by interchanging the subscripts ci and ao, and $\dot{G}''_{ao}$ is then the sum of mutual irradiance and the local concentrated irradiance $\dot{G}''_{s,ao}$ at the outer surface of absorber pipe.

The local concentrated irradiance is obtained from the LCR profiles for the tube and absorber pipe given by the optical model described earlier. The profiles are projected onto the corresponding surfaces and interpolated. $\dot{G}''_{s,co}$ and $\dot{G}''_{s,ao}$ are therefore obtained as $$\dot{G}''_{s,co} = \gamma \rho_{cl} \dot{G}''_b LCR_{co}(x,y,z) \tag{14}$$

and $$\dot{G}_{s,ao} = \eta_{opt} \dot{G}''_b LCR_{ao}(x,y,z). \tag{15}$$

Here the optical efficiency $\eta_{opt}=a_a\gamma\rho_{cl}\tau_c$ where $\gamma$ represents the intercept factor accounting for absorber pipe shadowing, twisting and tracking error, geometry error, dirt on mirrors, dirt on HCE, and miscellaneous optical efficiency; and $\rho_{cl}$ and $\tau_c$ denote clean mirror reflectance and tube transmittance, respectively.

The boundary conditions at the absorber pipe inlet included fully-developed average flow velocity evaluated at the inlet fluid temperature $T_{f,i}$ since periodic flow conditions could not be imposed with temperature-dependent fluid properties; no-slip condition at the inner surface of the absorber pipe; symmetry about the vertical centerline in the x-y plane ($\partial T/\partial n=0$); and outflow condition at the absorber pipe outlet, i.e., $\mu(\partial u/\partial n)=0$, $p=0$, and $\partial T/\partial n=0$.

The first law efficiency of a PTC, 17c, is defined as the ratio of useful heat $\dot{Q}_u$ and incoming solar energy, $$\eta_c = \frac{\dot{Q}_u}{G_b'' A_{ap}} = \frac{\dot{m}_f \int_{T_{f,i}}^{T_{f,o}} c_p(T)dT}{G_b'' A_{ap}}, \quad (16)$$

where the subscripts f, i and f, o denote fluid inlet and outlet while the aperture area $A_{ap}$ is determined as $$A_{ap} = 4L_f \tan\left(\frac{\psi}{2}\right)L. \quad (17)$$

The second law efficiency (exergetic efficiency) is given by $$\eta_{ex} = 1 - \frac{\dot{X}_l + \dot{X}_d}{\dot{X}_s}, \quad (18)$$

where $\dot{X}_s$ is the solar exergy (exergy flow on the incoming undiluted solar irradiance) determined according to the Petela model as $$\dot{X}_s = G_b'' A_{ap}\left[1 - \frac{4}{3}\left(\frac{T_o}{T_s}\right) + \frac{1}{3}\left(\frac{T_o}{T_s}\right)^4\right], \quad (19)$$

in which $T_s=5770K$. The exergy loss $\dot{X}_l$ in Eq. (18) is given by $$\dot{X}_l = \dot{X}_{l,opt} + \dot{X}_{l,Q}, \quad (20)$$

where $\dot{X}_{l,opt}$ and $\dot{X}_{l,Q}$ are exergy losses associated with optical and thermal losses obtained as $$\dot{X}_{l,opt} = (1-\eta_{opt})\dot{X}_s \quad (21)$$

and $$\dot{X}_{l,Q} = \int_\Omega \left(1 - \frac{T_o}{T}\right)\dot{Q}_{loss}''. \quad (22)$$

Here $\dot{Q}''_{loss}$ is the radiosity of the outer surface of the absorber pipe, i.e., heat leaving the absorber pipe via radiation as convection in the annulus is not considered.

The destruction term in Eq. (18) can be expanded to $$\dot{X}_d = \dot{X}_{d,\Delta P} + \dot{X}_{d,\dot{Q}_a} + \dot{X}_{d,\dot{Q}_f} \quad (23)$$

in which the terms on the right represent exergy destruction due to pressure drop, heat transfer from the sun to the absorber pipe outer surface, and from the absorber pipe to the heat transfer fluid, respectively. The terms in Eq. (23) are computed as follows:

$$\dot{X}_{d,\Delta P} = T_0 \dot{m}_f \Delta P\left(\frac{\ln(T_{f,o}/T_{f,i})}{\rho_f(T_{f,o} - T_{f,i})}\right) \quad (24)$$

$$\dot{X}_{d,\dot{Q}_a} = \eta_{opt}\dot{X}_s - \int_\Omega \left(1 - \frac{T_0}{T}\right)\dot{G}''_{s,ao}, \quad (25)$$

and $$\dot{X}_{d,\dot{Q}_f} = T_0 \dot{m}_f\left(\int_{T_{f,i}}^{T_{f,o}} c_p(T)\frac{dT}{T} - \int_\Omega \frac{k_f}{T}\frac{\partial T}{\partial n}\right). \quad (26)$$

The LCR profiles were obtained first by solving the optical model as a function of the absorber pipe geometry. The hybrid Streamline/Upwind Petrov-Galerkin finite element method was then employed to discretize and solve Eqs. (5)-(7) along with the boundary conditions. A combination of hexahedral and tetrahedral quadratic Lagrange elements (p=2) was employed to discretize fluid velocity and pressure while temperature was discretized with linear elements (p=1). Adaptive damped Newton's method was used to update the variables and stepsize at each iteration, and the resulting systems of linear equations were solved using the Parallel Direct Sparse Solver developed to solve large sparse symmetric and asymmetric linear systems of equations on shared and distributed-memory architectures. The model was implemented in a commercial finite element package and MATLAB.

Figure 5:
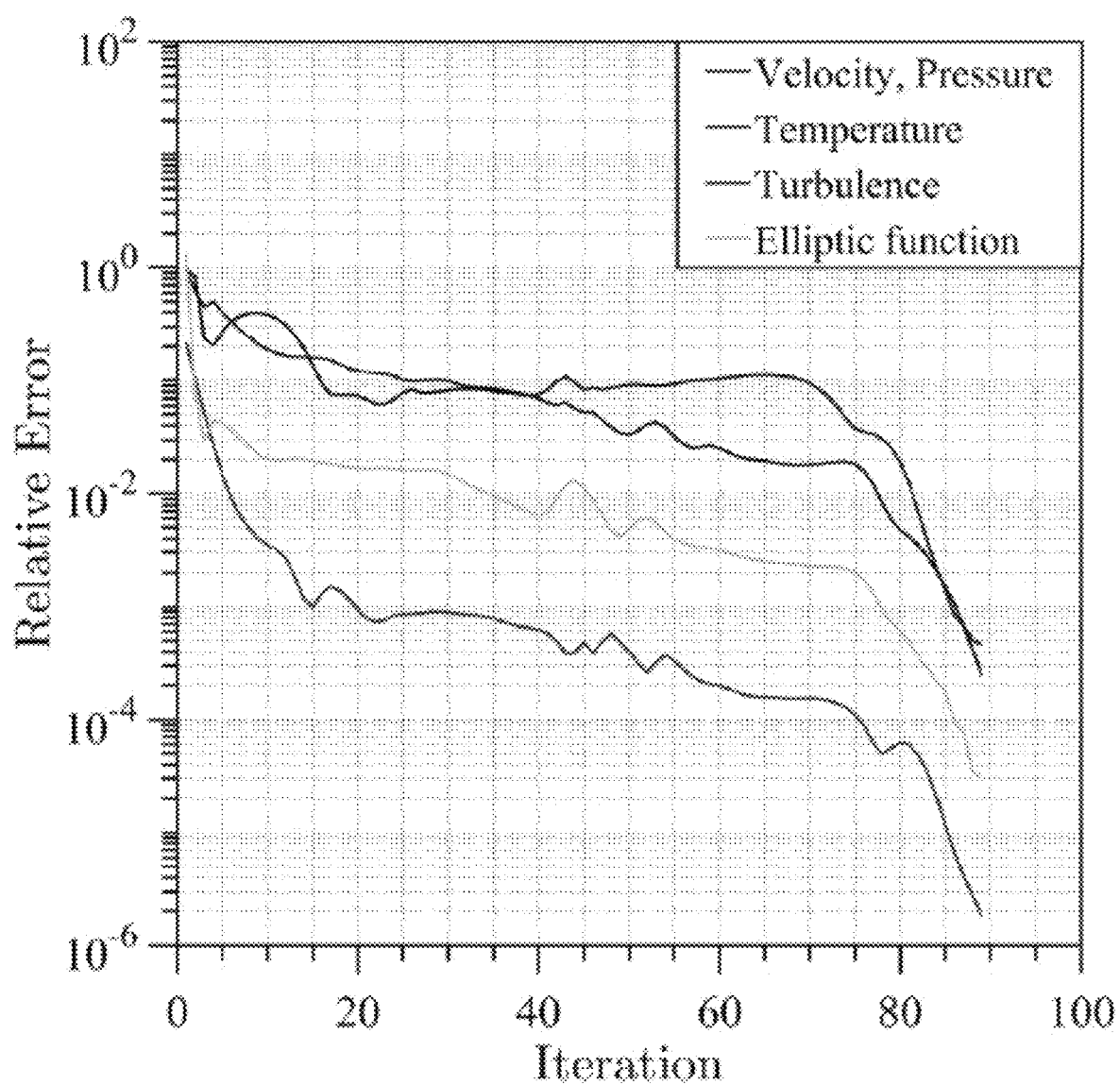
FIG. 5 is a convergence plot for an implementation of the absorber pipe, such as the absorber pipes shown in FIGS. 1B and 2A, that has seven waves and an amplitude of 0.006 m.

The converged solution was obtained when the relative error in the norm of individual solution vectors (i.e., velocity, pressure, turbulence variables, elliptic function, and temperature) reached $10^{-3}$. The relative residual was less than $10^{-14}$ in all cases. FIG. 5 shows the convergence plot for N=7 and A=0.006 m case as an example.

Figure 6A:
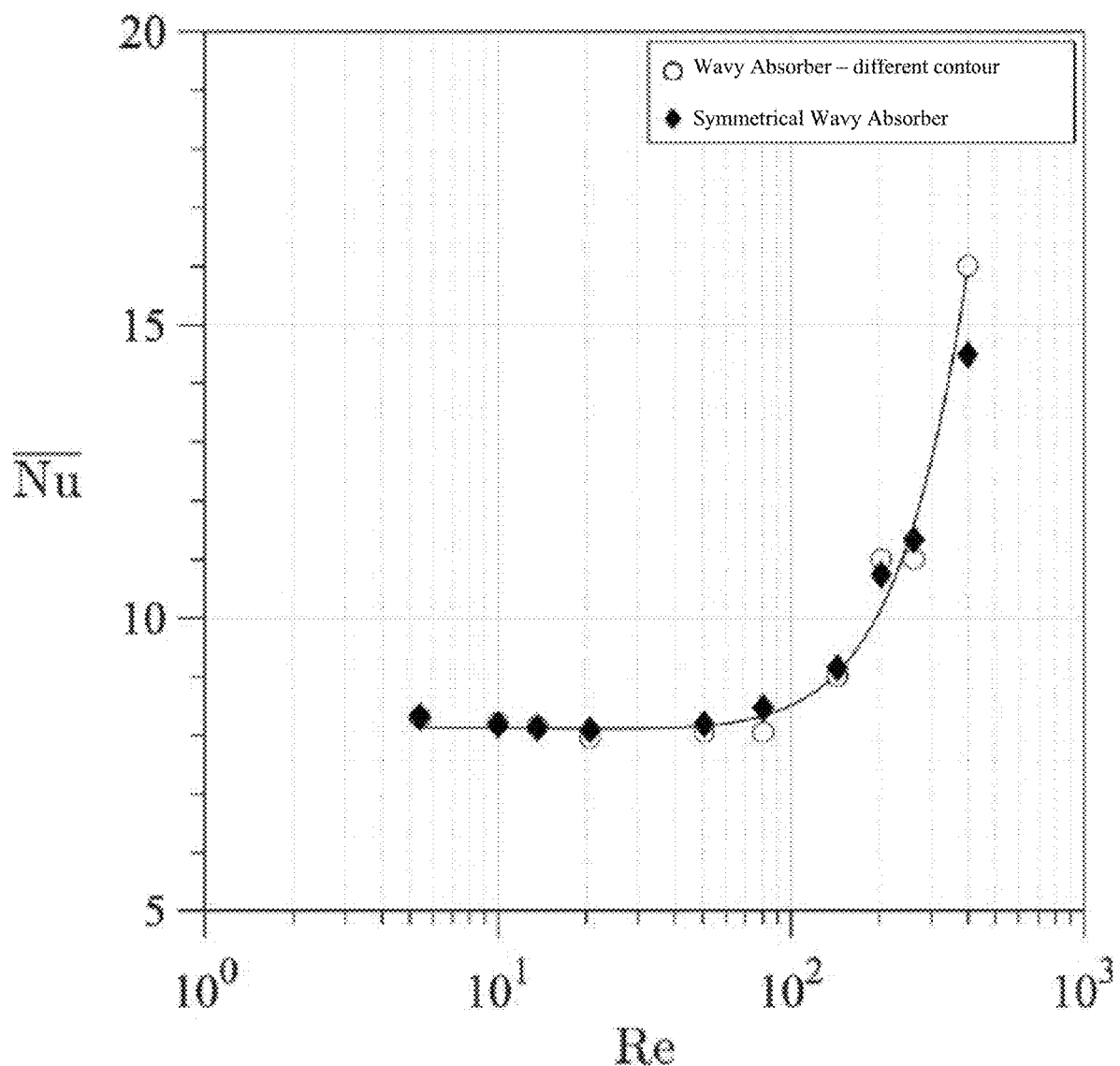
FIG. 6A is a validation plot for the absorber pipe, such as the absorber pipes shown in FIGS. 1B and 2A.

The model validation included two steps. First, only the symmetric wavy absorber pipe, such as shown in FIGS. 1B and 2A-2B, was simulated at different Reynolds numbers (Re), and corresponding average Nusselt numbers were compared against the results of a known wavy absorber pipe with a different contour than the contour described and shown herein, as shown in FIG. 6A. The complete PTC model with a conventional absorber pipe was then validated against experimental data with a conventional absorber pipe, and the first law efficiency was compared with the change in temperature in FIG. 6B. The average Nusselt number $\overline{Nu}$ from FIG. 6A is given by $$\overline{Nu} = \frac{2r_{ai}}{l}\int_0^l \left(\frac{1}{T_b(z)}\frac{\partial T}{\partial n}\right)ds, \quad (27)$$

where l is the total absorber pipe boundary length and $T_b(z)$ is the bulk fluid temperature in the axial direction z.

Figure 6B:
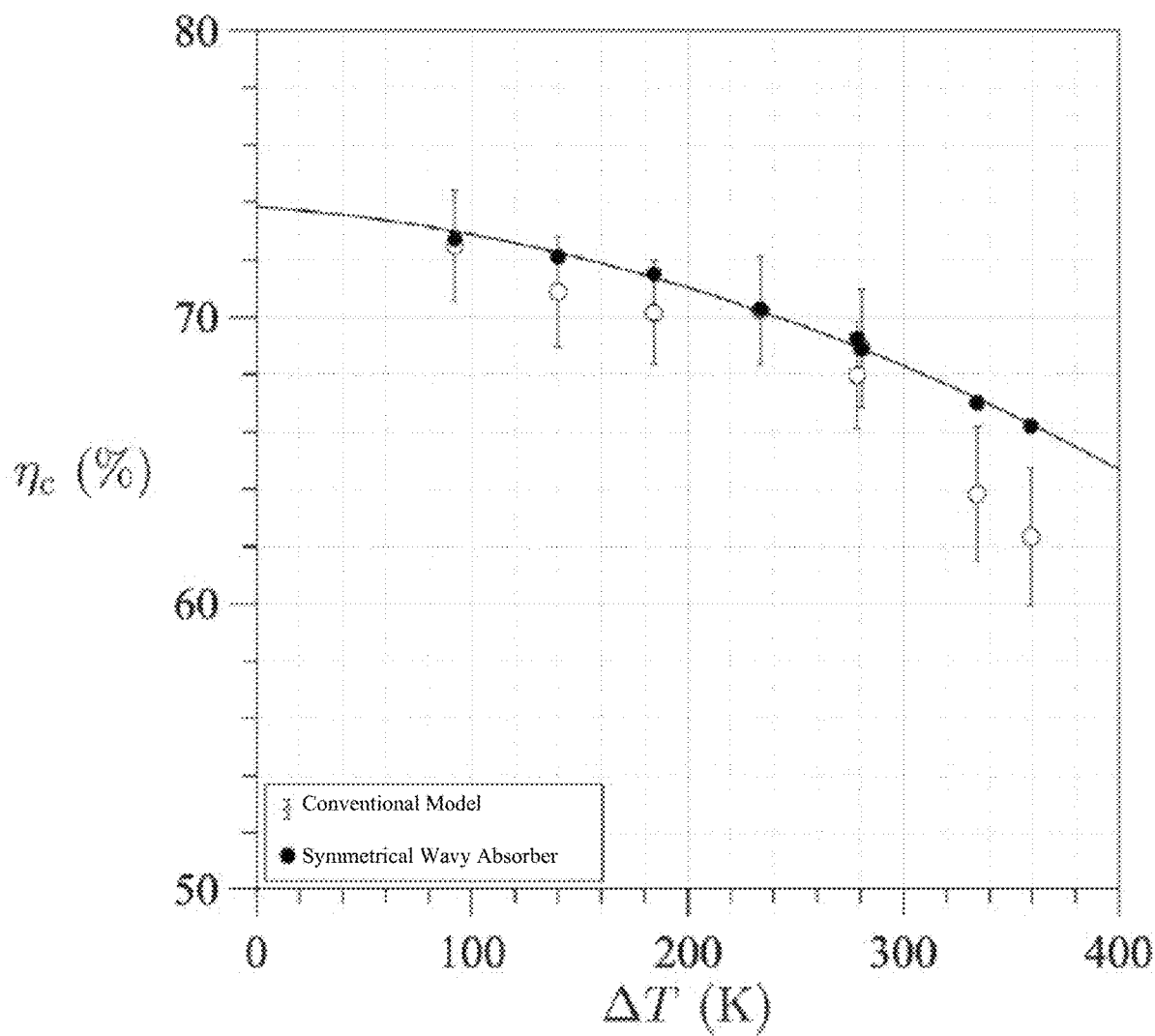
FIG. 6B is a validation plot for a complete PTC model with a conventional absorber pipe.

Simulation and experiment data are in good qualitative and quantitative agreement in both cases according to FIGS. 6A and 6B. The discrepancy in the observed and predicted absorber system efficiency at $\Delta T>300K$ in FIG. 6B is due to the absence of convection in the annulus which becomes predominant as the inlet fluid temperature increases. Nonetheless, all the other predictions are within the error margin and thus validate the model.

The problem included evaluating $\eta_c$ and $\eta_{ex}$ as functions of geometric parameters, namely N and A (thus $\lambda$), by means of exhaustive search under fixed length L of the tube and absorber pipe. This approach facilitated the quantification of the collector sensitivity to the considered parameter ranges as well as the determination of their physical implications. The considered ranges were 0.003 m≤A≤0.01 m and 5≤N≤10. In addition, the mass flow rate was varied from 1 kg/s≤$\dot{m}_f$≤10 kg/s while the inlet fluid temperature was fixed at 400K.

The modeled symmetric wavy absorber pipe, such as the pipes shown in FIGS. 1B and 2A, was compared against the conventional straight absorber pipe (i.e., A=0) under a fixed absorber pipe volume for a fair comparison. In other words, the conventional straight absorber pipe was elongated to achieve the same absorber pipe volume as the modeled symmetric wavy absorber pipe and thus the material cost remained fixed. The absorber system design and operational parameters used in the simulations are listed in Table 1.

TABLE 1

Collector design and operational parameters [42].

| | Description | Value (unit) |
| --- | --- | --- |
| $d_{ai}$ | Absorber inner diameter | 0.066 (m) |
| $d_{ao}$ | Absorber outer diameter | 0.070 (m) |
| $d_{ci}$ | Cover inner diameter | 0.105 (m) |
| $d_{co}$ | Cover outer diameter | 0.115 (m) |
| $\dot{G}_b''$ | Beam radiation | 1000 (W/m$^2$) |
| L | Collector length | 1 (m) |
| $L_f$ | Focal length | 1.84 (m) |
| $P_{as}$ | Annular pressure | 0 (Pa) |
| $T_0$ | Ambient temperature | 293.15 (K) |
| $T_{f,i}$ | Inlet fluid temperature | 400 (K) |
| $U_0$ | Ambient wind speed | 0.2 (m/s) |
| $\alpha_a$ | Absorber absorptance | 0.95 |
| $\alpha_c$ | Cover absorptance | 0.023 |
| $\gamma$ | Intercept factor | 0.848 |
| $\varepsilon_a$ | Absorber emittance | 0.14 |
| $\varepsilon_c$ | Cover emittance | 0.86 |
| $e_{cl}$ | Clean mirror reflectance | 0.935 |
| $T_c$ | Envelope transmittance | 0.95 |
| $\Psi$ | Rim angle | 70° |
| | Absorber Material | 321H SS |
| | Envelope material | Pyrex glass |
| | Heat transfer fuid | Syltherm 800 |
| | Selective coating | Luz cermet |

TABLE 2

Mesh refinement results.

| DOF | $\overline{Nu}$ | Difference | $T_{max}$ | Difference |
| --- | --- | --- | --- | --- |
| 91783 | 4.758 | — | 430.3 | — |
| 135191 | 4.918 | 3.2% | 434.4 | 0.9% |
| 501041 | 5.134 | 4.2% | 437.4 | 0.7% |
| 1695759 | 5.159 | 0.5% | 438.9 | 0.3% |

The heat transfer and flow characteristics of each design configuration were evaluated based on temperature fields, streamlines, $\overline{Nu}$, and $\Delta P$. In particular, the absorber system performance was examined based on the performance evaluation criteria (PEC) obtained as follows:

$$PEC = \frac{\overline{Nu}/\overline{Nu}_0}{(\Delta P/\Delta P_0)^{1/3}}, \qquad (28)$$

where the subscript 0 denotes the straight absorber pipe design. As its name suggests, PEC is useful in comparing the performance of novel absorber pipe designs against the traditional or previously developed ones while accounting for both pressure drop (pumping power) and thermal performance (heat transfer enhancement).

Table 2 lists the grid convergence study results in which $\overline{Nu}$ and the maximum fluid temperature in the absorber system ($T_{max}$) are compared. $T_{max}$ depends on one nodal temperature and converges quicker as the mesh size increases, whereas $\overline{Nu}$ is computed based on multiple nodal values and exhibits a slower convergence. Mesh refinements continued until the relative error of both values became less than 1%.

Figure 7A:
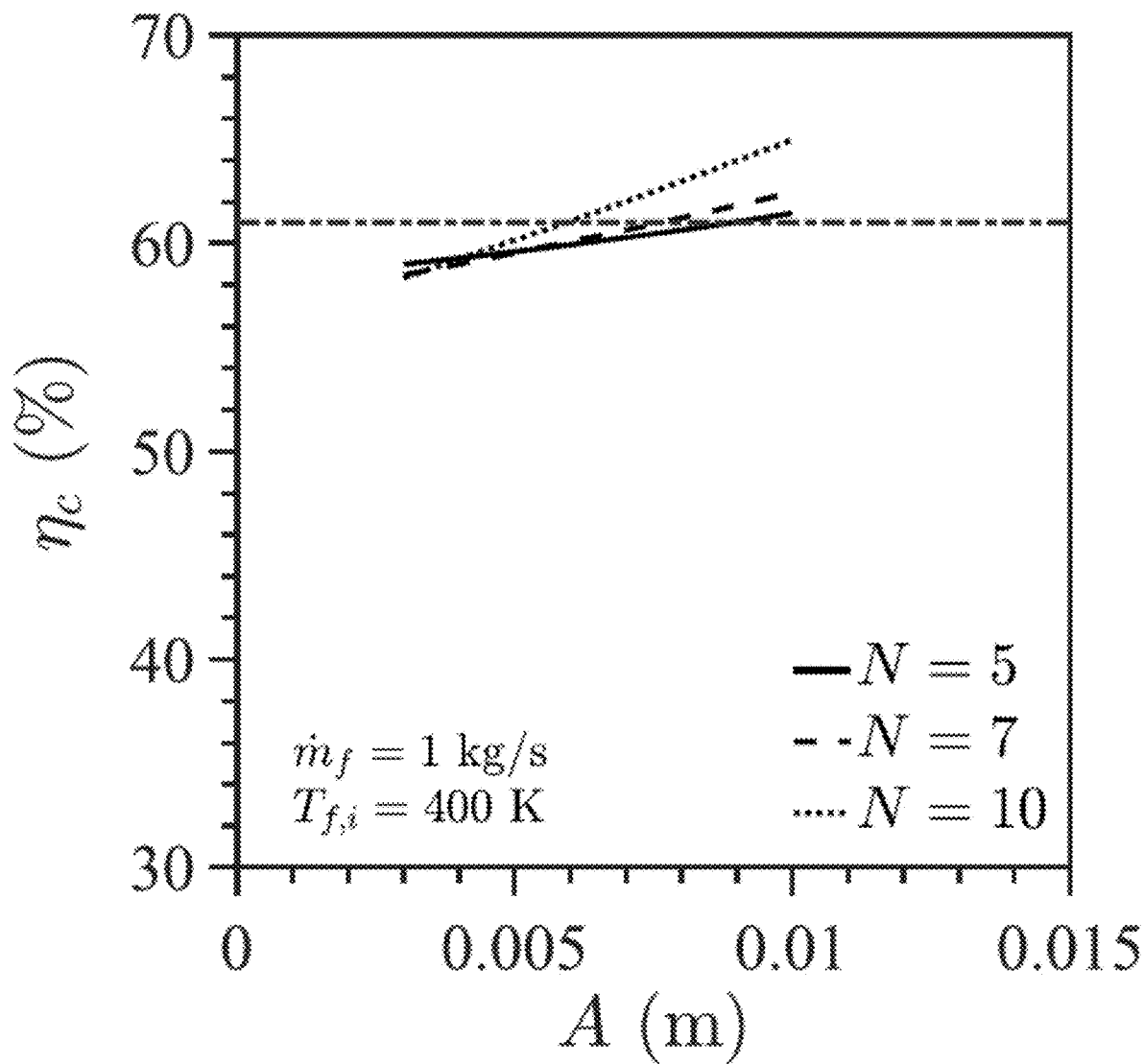
FIG. 7A shows variations of first law efficiency as functions of the number of waves of the absorber pipe, such as the absorber pipes shown in FIGS. 1B and 2A, and amplitude for a mass flow rate of 1 kg/s.

FIGS. 7A-9B depict the variations of $\eta_c$ and $\eta_{ex}$ as functions of N and A for $\dot{m}_f$=1, 5, and 10 kg/s. The dotted red horizontal lines indicate the corresponding efficiency obtained with the straight absorber pipe design (A=0), and only one red line is plotted in each graph for comparison purposes as the pipe elongation was minimal. The maximum relative elongation of the straight absorber pipe was 3% of the length L defined for the symmetric wavy pipe, such as the pipes shown in FIGS. 1B and 2A. In FIGS. 7A and 7B, qc increases almost linearly along with A for all N. Although N=5 barely outperforms the conventional absorber pipe when A=0.01 m, the superior performance of N=7 is apparent when A=0.01 m. On the other hand, higher $\eta_{ex}$ is always achieved with the wavy absorber pipe for all N and A, and that of N=10 exhibits a nonlinear rise with respect to A.

Figure 7B:
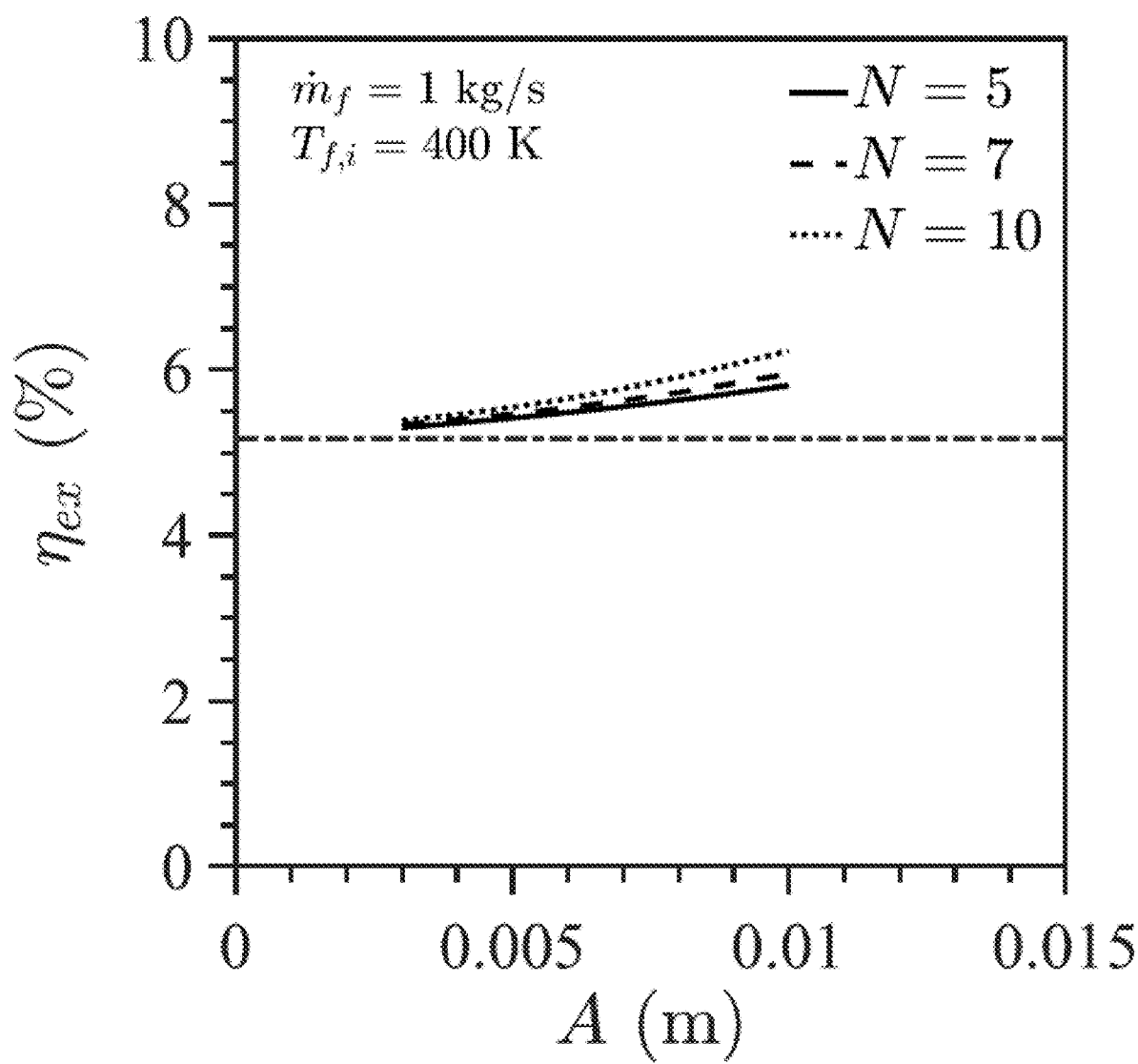
FIG. 7B shows variations of second law efficiency as functions of the number of waves of the absorber pipe, such as the absorber pipe shown in FIGS. 1B and 2A, and amplitude for a mass flow rate of 1 kg/s.
Figure 8A:
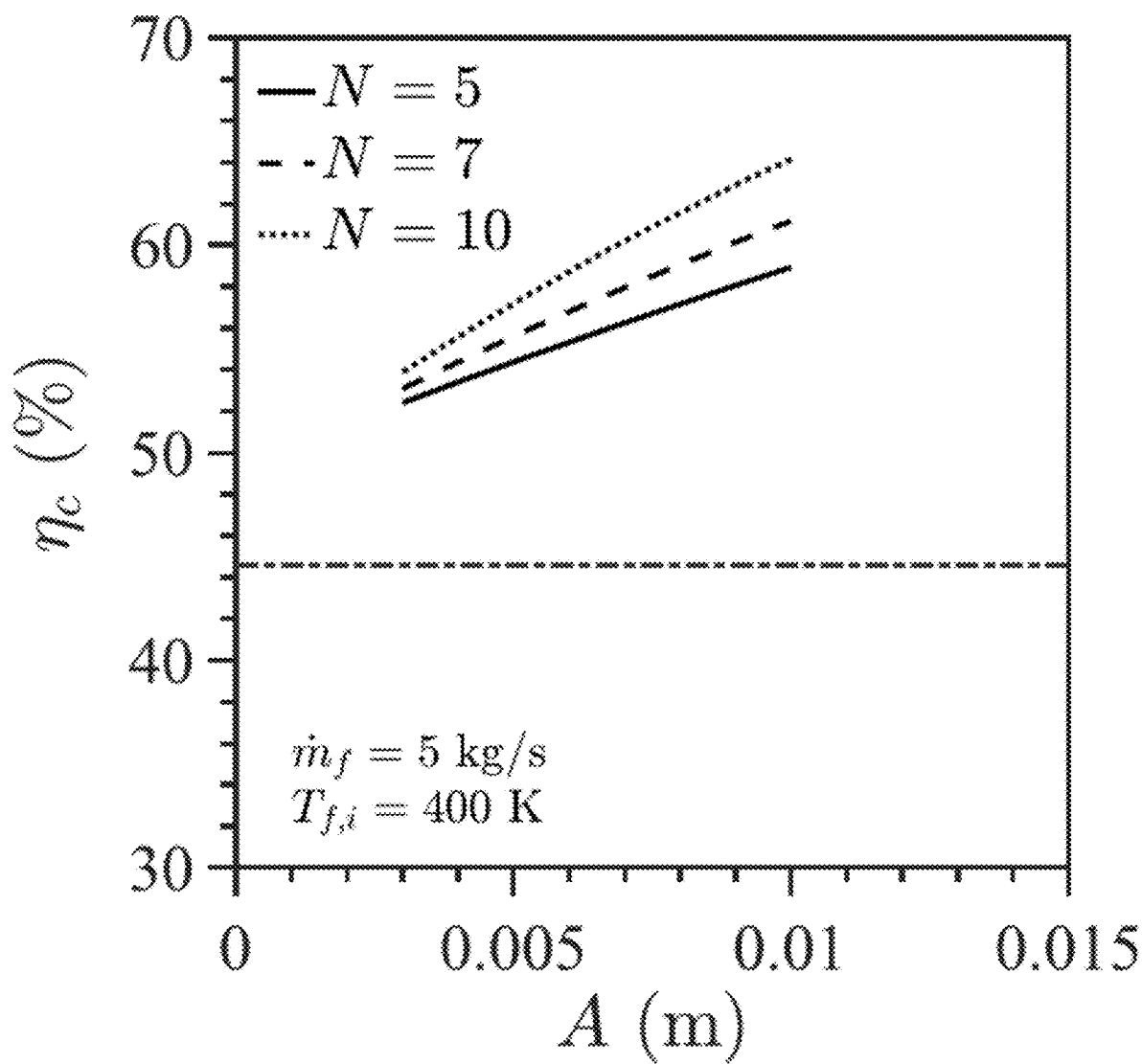
FIG. 8A shows variations of first law efficiency as functions of the number of waves of the absorber pipe, such as the absorber pipe shown in FIGS. 1B and 2A, and amplitude for a mass flow rate of 5 kg/s.
Figure 8B:
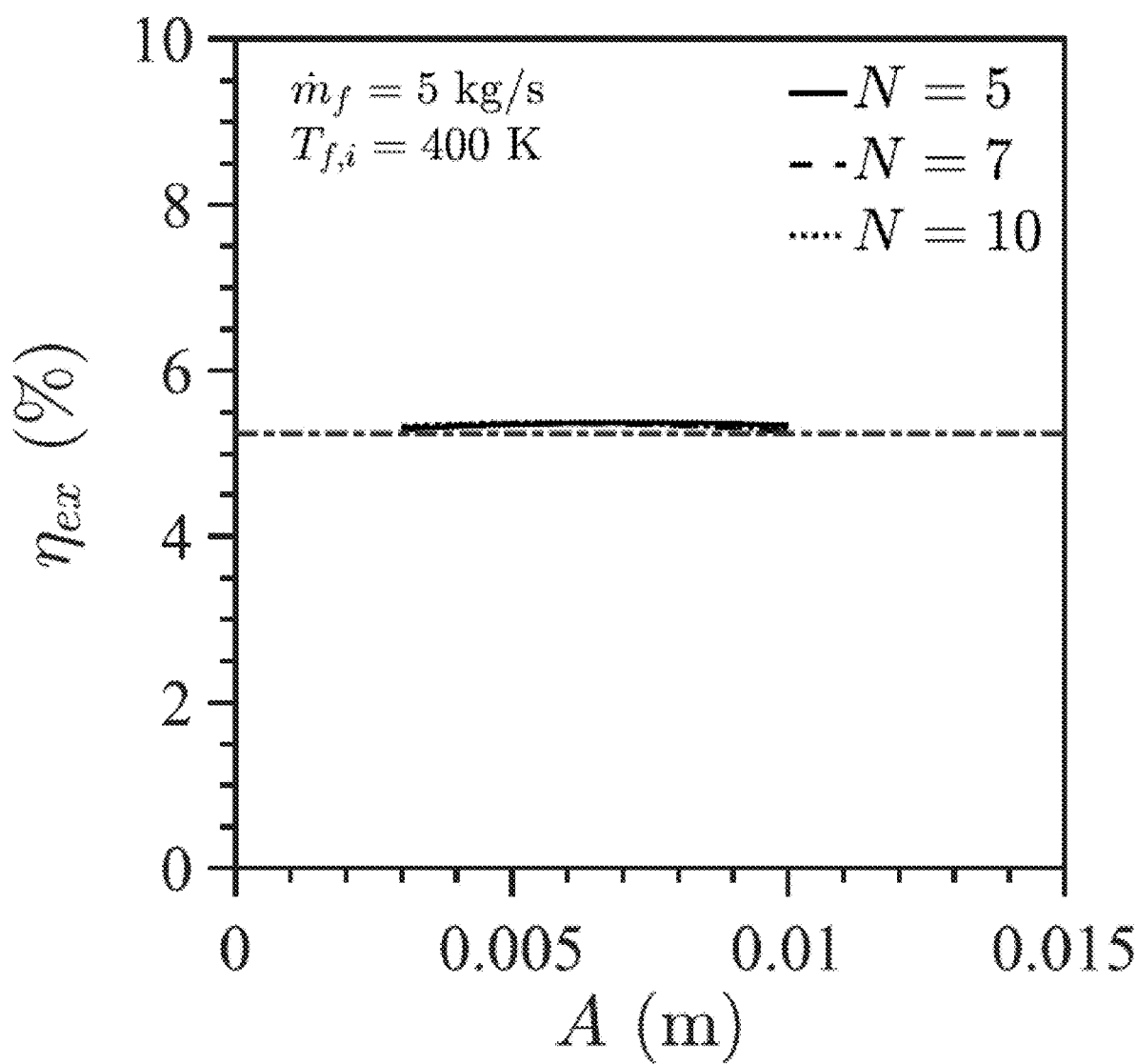
FIG. 8B shows variations of second law efficiency as functions of the number of waves of the absorber pipe, such as the absorber pipe shown in FIGS. 1B and 2A, and amplitude for a mass flow rate of 5 kg/s.
Figure 10:
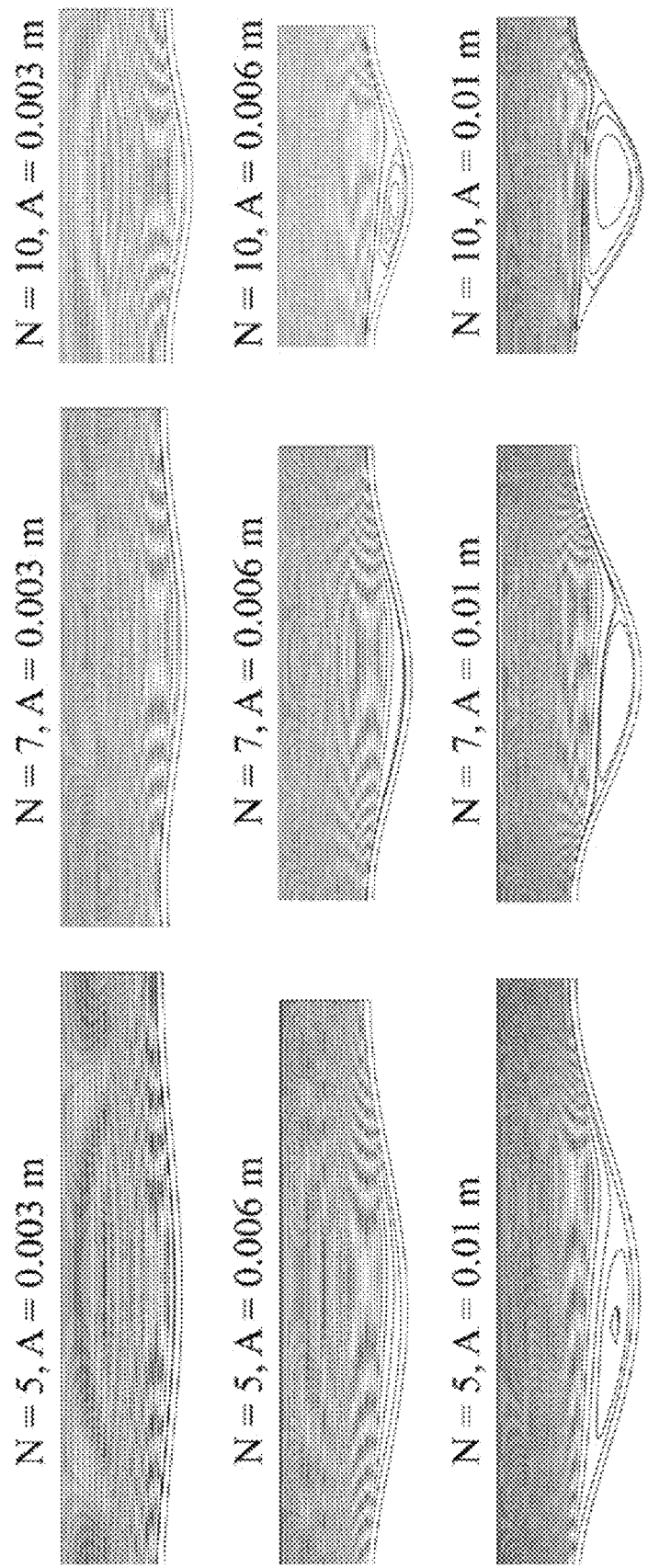
FIG. 10 shows streamlines at the last pipe segment cross section of an absorber pipe, such as the absorber pipe shown in FIGS. 1B and 2A, for different numbers of waves and different amplitudes while the mass flow rate is 1 kg/s.

According to FIGS. 7A and 7B, $\eta_c$ of the wavy absorber pipe is lower than that of the conventional pipe until A>0.006 m. At low mass flow rates (e.g., 1 kg/s), the heat transfer depends heavily on the presence of flow recirculation and deceleration in convex regions. When A=0.003 m, for instance, the heat transfer rate (or $\eta_c$) decreases as the convexity (or N) increases; hence, $\eta_c$ of N=10 is lower than that of N=5 in FIG. 7A. However, the trend overturns as $\eta_c$ of N=10 starts to surpass that of others as A increases. FIG. 10 displays streamlines at the last absorber pipe segment cross section for different N and A while $\dot{m}_f$=1 kg/s, and in reference to FIGS. 7A and 7B, N=10 begins to achieve superior performance over the other designs as soon as it forms recirculation regions. The same behavior is observed with N=5 and N=7, both of which exhibit higher $\eta_c$ than the conventional one once the flow starts to separate.

$\eta_c$ of the conventional straight absorber pipe design decreases drastically as $\dot{m}_f$ increases according to FIGS. 8A-9B. The slope of $\eta_c$ becomes steeper as $\dot{m}_f$ increases for all N and the interval between the least and peak $\eta_c$ stretches. The peak $\eta_c$ for $\dot{m}_f$=1 kg/s in FIG. 7A, for example, is 65% while that for $\dot{m}_f$=10 kg/s is 67.14%. Such observations are examined further later in this section. Unlike $\eta_c$, $\eta_{ex}$ of the conventional absorber pipe barely decrease with respect to increasing $\dot{m}_f$, whereas the modeled symmetric wavy absorber pipe design yields $\eta_{ex}$ whose slope shifts gradually from positive to negative as $\dot{m}_f$ increases. $\eta_{ex}$ is nearly independent of N and A and close to that of the conventional absorber pipe when $\dot{m}_f$=5 kg/s, after which $\eta_{ex}$ becomes a decreasing function of A. Such a shift in $\eta_{ex}$ trend is investigated further based on the results in FIG. 11.

Figure 11:
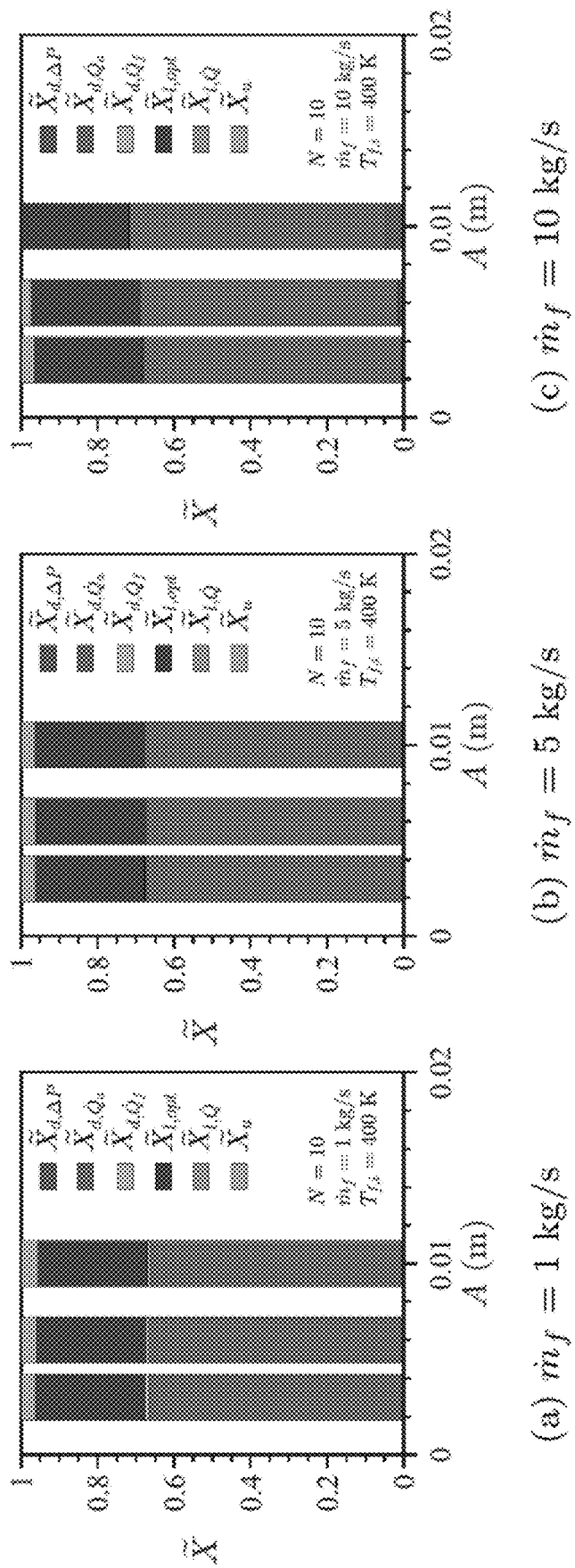
FIG. 11 shows normalized exergy destruction and loss in an absorber pipe, such as the absorber pipe shown in FIGS. 1B and 2A, as functions of amplitude and mass flow rate wherein the number of waves of the absorber pipe is 10.

FIG. 11 shows the contribution of each absorber system component and energy transfer mechanism to the total exergy destruction and loss normalized as $\tilde{X}=\dot{X}_i/\dot{X}_s$ for N=10. The exergy destroyed due to pressure drop, $\tilde{X}_{d,\Delta P}$, increases along with A, especially when $\dot{m}_f$=10 kg/s as the effective hydraulic diameter dwindles and a larger recirculation region is formed. $\tilde{X}_{d,\Delta p}$ is identified as the major factor causing the slope of $\eta_{ex}$ to shift from positive to negative with respect to increasing $\dot{m}_f$ as its contribution becomes evident only at higher $\dot{m}_f$ according to FIG. 11. The exergy destroyed due to heat transfer from the sun to the absorber pipe surface, $\tilde{X}_{d,\dot{Q}a}$, remains nearly constant in all cases as the absorber pipe boundary is shifted vertically by $r_{ai}$ and $r_{ao}$ to ensure constant mean solar concentration. $\tilde{X}_{d,\dot{Q}f}$ is notable only at a low $\dot{m}_f$ and A. The pressure drop and heat transfer across the last segment of the modeled symmetric wavy absorber pipe are analyzed further based on the streamlines and temperature fields shown in FIG. 12.

Figure 12:
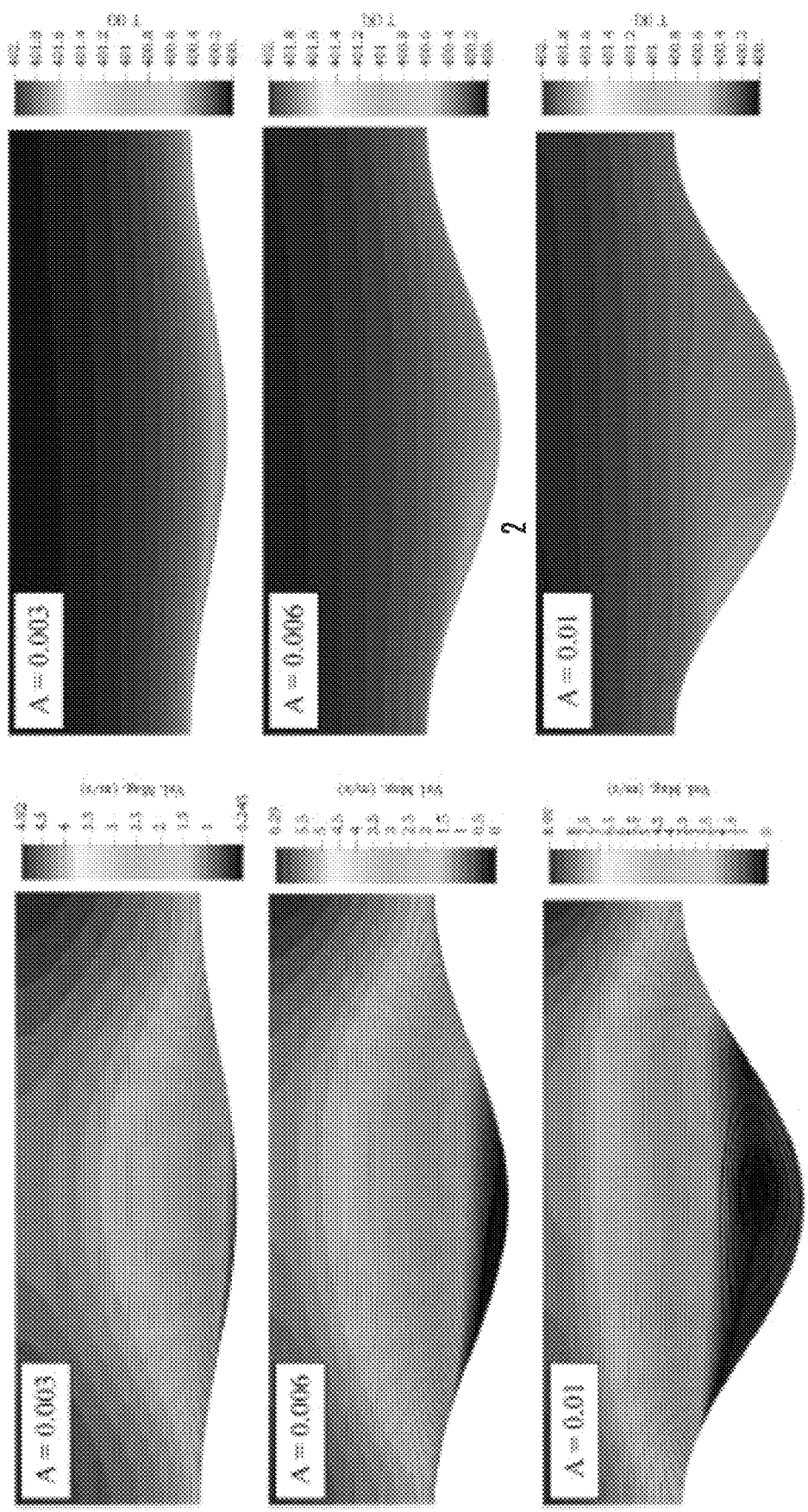
FIG. 12 shows velocity and temperature fields as functions of amplitude wherein the number of waves of the absorber pipe, such as the absorber pipe shown in FIGS. 1B and 2A, is 10 and the mass flow rate is 10 kg/s.
Figure 13:
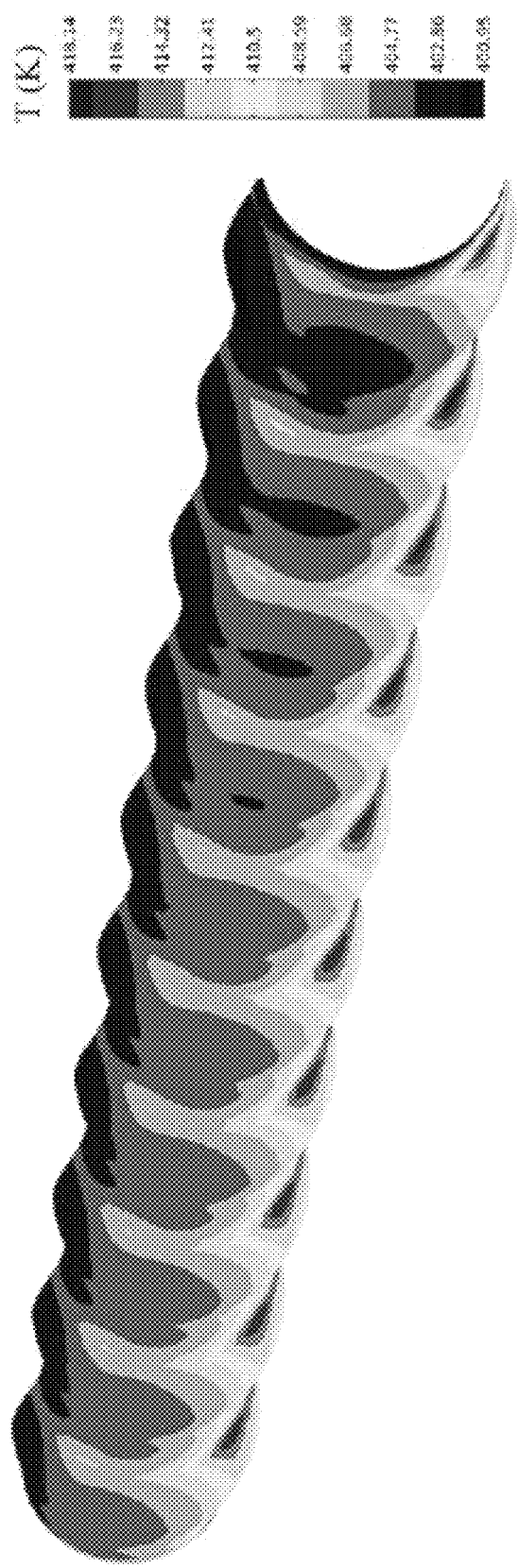
FIG. 13 shows fluid temperature distribution at the boundary with an absorber pipe, such as the absorber pipe shown in FIGS. 1B and 2A, in which the number of waves is ten and the amplitude is 0.003 m.

According to FIG. 12, the convex area covered by the separated flow increases along with A and the effective pipe diameter dwindles thereby, causing a larger pressure drop. FIG. 12 also demonstrates how A=0.01 m yields a higher mean fluid temperature and a more gradual temperature gradient near the absorber pipe boundary due to the accelerated flow and its resulting heat transfer enhancement and mixing. Higher convective heat transfer is achieved at narrower pipe throats (inlet and outlet of the convex region) as the fluid accelerates through them which are also subjected to higher local solar concentration (refer to FIG. 3B for the distribution of local concentration ratio in a symmetric wavy pipe, such as the pipes shown in FIGS. 1B and 2A). Similar observations were made from a direct numerical simulation of forced convection in a wavy channel. FIG. 13 depicts the fluid temperature distribution at the boundary with the absorber pipe whose hot spots are observed at the throats according to its local concentration profile. As a result, $\eta_c$ increases along with N and A and remains relatively high even at high mass flow rates unlike the conventional straight absorber pipe.

Figure 9A:
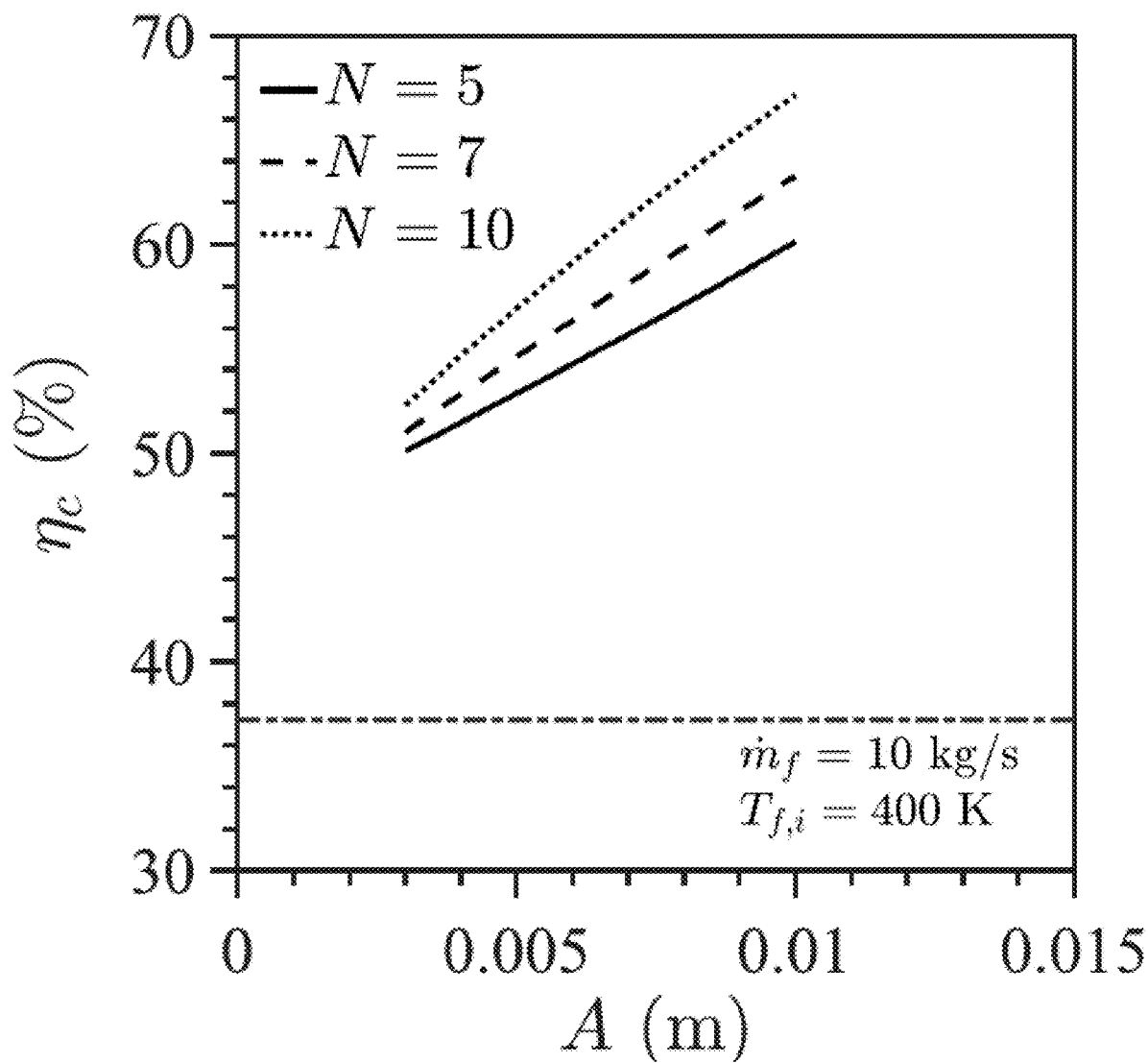
FIG. 9A shows variations of first law efficiency as functions of the number of waves of the absorber pipe, such as the absorber pipe shown in FIGS. 1B and 2A, and amplitude for a mass flow rate of 10 kg/s.
Figure 9B:
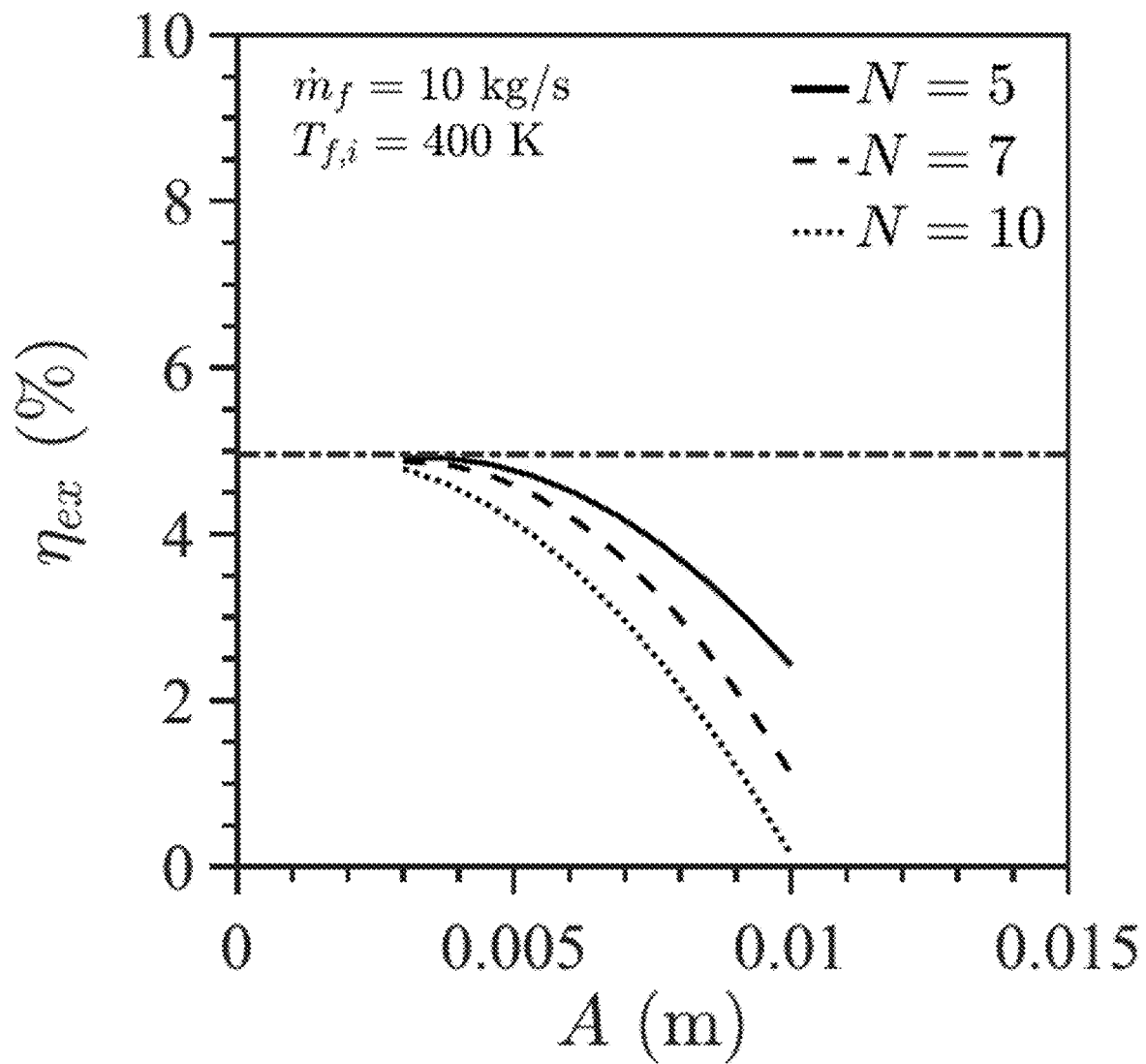
FIG. 9B shows variations of second law efficiency as functions of the number of waves of the absorber pipe, such as the absorber pipe shown in FIGS. 1B and 2A, and amplitude for a mass flow rate of 10 kg/s.
Figure 14:
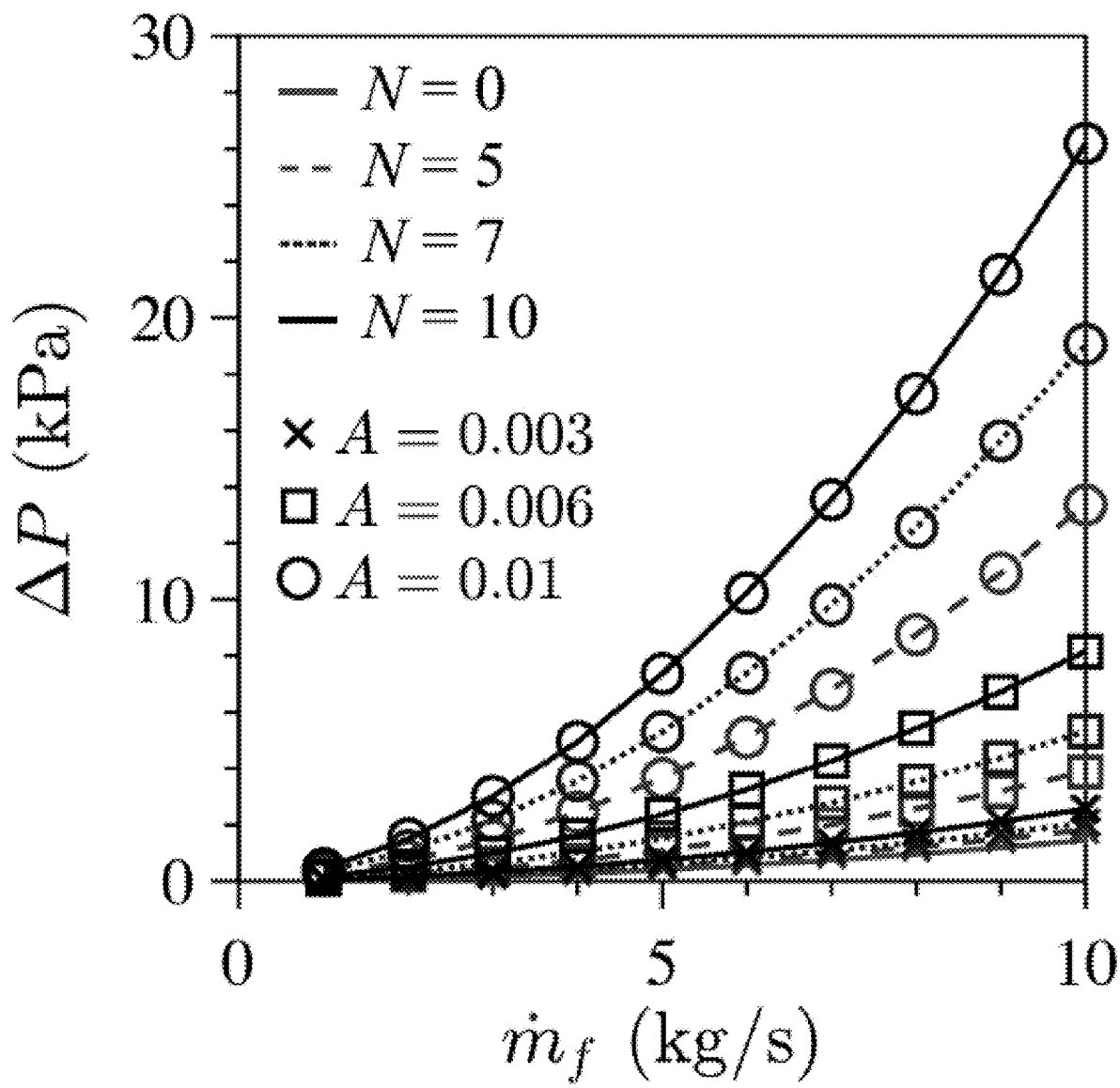
FIG. 14 shows a pressure drop as a function of fluid mass flow rate for different numbers of waves and amplitudes through an absorber pipe, such as the absorber pipe shown in FIGS. 1B and 2A.

FIG. 14 depicts the pressure drop ($\Delta P$) as a function of mass flow rate for different N and A according to which the difference in $\Delta P$ between N=0 and the rest is remarkably high, especially at $\dot{m}_f$=10 kg/s since $\Delta P$ is proportional to the square of the flow rate. The exergy destruction due to pressure drop ($\tilde{X}_{d,\Delta p}$) is therefore pronounced at a high $\dot{m}_f$ (refer to FIG. 11), N, and A, causing $\eta_{ex}$ to decrease rapidly with respect to increasing N and A as shown in FIG. 9B. The peak $\Delta P$ is observed with N=10 and A=0.01 m and is approximately 20 times greater than that observed across the straight absorber pipe.

Figure 15:
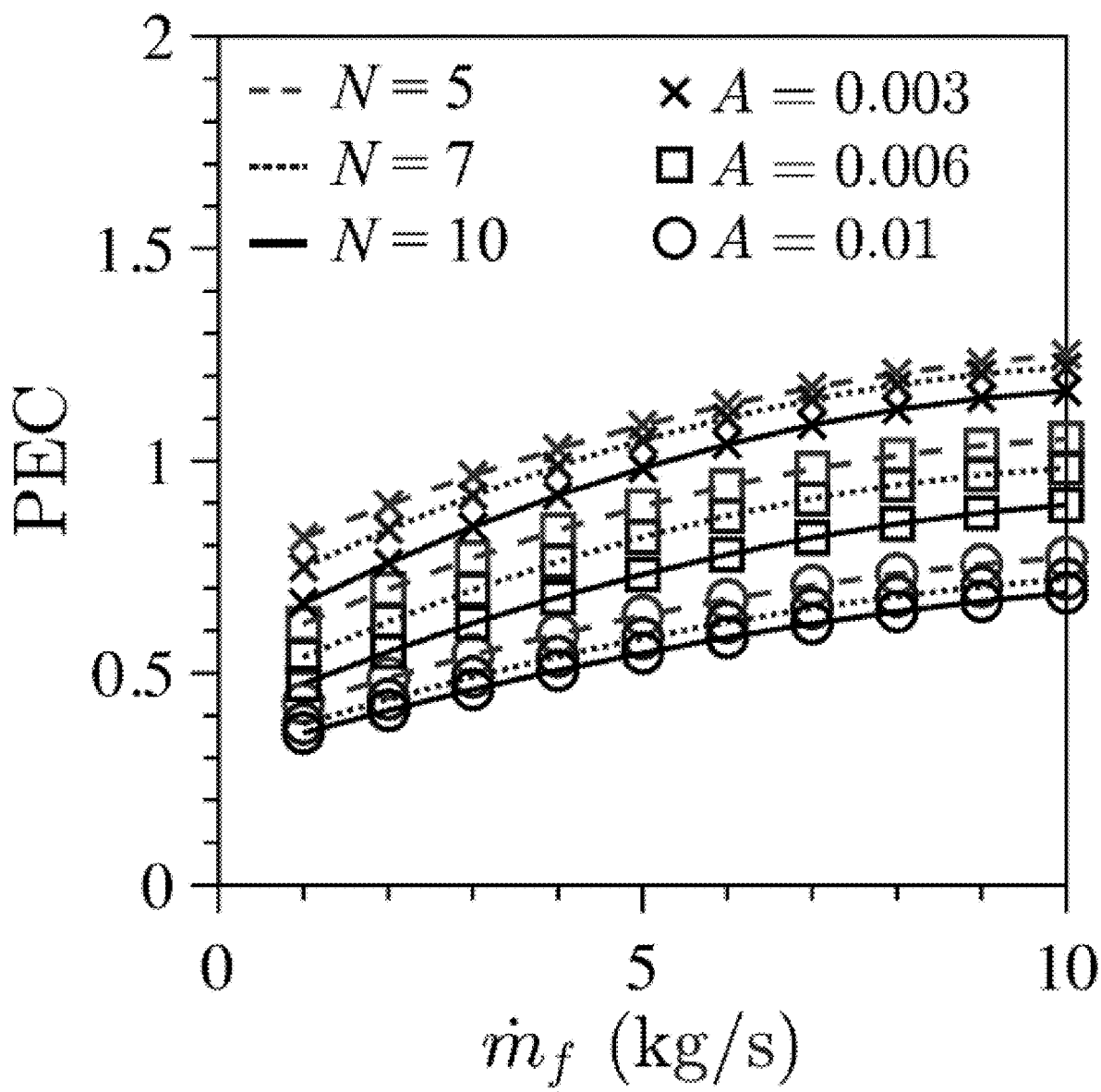
FIG. 15 shows performance evaluation criteria as a function of fluid mass flow rate for different numbers of waves and amplitudes through an absorber pipe, such as the absorber pipe shown in FIGS. 1B and 2A.

The PEC given by Eq. (28), which accounts for both heat transfer enhancement and pressure drop in the modeled symmetric wavy absorber pipe design relative to the straight absorber pipe, is plotted in FIG. 15 against the fluid mass flow rate for different N and A. The physical implications of the qualitative trends in FIG. 15 can be discerned based on the results presented above, namely $\eta_c$ in FIGS. 7A-9B and $\Delta P$ in FIG. 14. The peak PEC is achieved with N=5 and A=0.003 m as the design exhibits the least pressure drop, and the PEC is above unity when the heat transfer enhancement outweighs the increased pressure drop at $\dot{m}_f \geq 5$ kg/s and A=0.003 m for all N. The PEC increases along with $\dot{m}_f$ for all N as more useful heat is gained by the fluid. When A>0.006 m and $\dot{m}_f$<5 kg/s, however, PEC≤1 due to an escalated pressure drop which offsets the heat transfer enhancement. From a thermal-hydraulic standpoint, N=5 and A=0.003 m is therefore the most preferred configuration in the design space explored herein.

The performance of the symmetric wavy absorber pipe, such as the pipes shown in FIGS. 1B and 2A, was evaluated herein by means of an experimentally validated 3D PTC model coupled to a semi-analytical optical model. Subsequently, the following observations and conclusions were deduced from this study:

1. Significant improvement in $\eta_c$ was observed with the modeled symmetric wavy absorber pipe design, especially at high $\dot{m}_f$ due to the accelerated flow across the pipe throat which in turn enhanced the mixing and heat transfer between the absorber pipe and the working fluid. For example, collector efficiency improves by 20% or more with the symmetrical wavy absorber pipe compared with using a conventional straight absorber pipe.

2. The variation of $\eta_{ex}$ shifted from an increasing to a decreasing trend with respect to A as $\dot{m}_f$ increased and the exergy destroyed due to pressure drop became evident accordingly.

3. The PEC verified the superior performance of the modeled symmetric wavy absorber pipe design over the conventional straight absorber pipe as the peak PEC≈1.25 despite its increased pressure drop across the pipe. However, PEC≤1 for all N and $\dot{m}_f$ when A>0.006 m due to an escalated pressure drop that overturned the heat transfer enhancement.

In various implementations, a symmetric wavy absorber pipe, such as the pipes shown in FIGS. 1B and 2A, with a smaller N and A enhances heat transfer while diminishing the effect of pressure drop as compared to the conventional straight absorber pipe.

A number of implementations have been described. Nevertheless, it will be understood that various modifications may be made without departing from the spirit and scope of the claims. Accordingly, other implementations are within the scope of the following claims.

Certain terminology is used herein for convenience only and is not to be taken as a limitation on the present claims. In the drawings, the same reference numbers are employed for designating the same elements throughout the several figures. A number of examples are provided, nevertheless, it will be understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

The invention claimed is:

1. A solar thermal energy collection system comprising a solar energy concentrator, a heat transfer fluid, and an absorber pipe through which the heat transfer fluid flows for absorbing concentrated solar energy incident on the absorber pipe from the solar energy concentrator, the absorber pipe comprising a pipe wall that extends about and around a central longitudinal axis that extends between each end of the absorber pipe, the pipe wall comprising an inner surface and an outer surface, the inner surface defining a first contour defining alternating peaks and troughs along a length of the absorber pipe, and the outer surface defining a second contour defining alternating peaks and troughs along the length of the absorber pipe, wherein:

the inner surface defines an entire flow path for the heat transfer fluid through the absorber pipe, wherein the entire flow path is defined between an inlet and an outlet of the absorber pipe, the first contour, as viewed through an axial cross section of the absorber pipe, forms sinusoidal waves on each side of and spaced apart from the central longitudinal axis, wherein the sinusoidal waves on each side of the central longitudinal axis are symmetrical with respect to the central longitudinal axis, at least a portion of the absorber pipe is disposed along a focal line of the solar energy concentrator, and the second contour, as viewed through the axial cross section of the absorber pipe, forms sinusoidal waves on each side of and spaced apart from the central longitudinal axis, wherein the sinusoidal waves of the second contour on each side of the central longitudinal axis are symmetrical with respect to the central longitudinal axis.

2. The solar thermal energy collection system of claim 1, wherein the pipe wall has a maximum radius as measured between the inner surface and the central longitudinal axis at each peak and a minimum radius as measured between the inner surface and the central longitudinal axis at each trough.

3. The solar thermal energy collection system of claim 1, wherein the outer surface of the pipe wall has a second maximum radius as measured between the outer surface and the central longitudinal axis at each peak and a second minimum radius as measured between the outer surface and the central longitudinal axis at each trough.

4. The solar thermal energy collection system of claim 1, wherein the peaks and troughs of the inner surface are radially aligned with the peaks and troughs of the outer surface.

5. The solar thermal energy collection system of claim 1, wherein a thickness between the inner surface and the outer surface of the wall is constant along the length of the wall.

6. The solar thermal energy collection system of claim 1, wherein the inner surface is shaped to induce a plurality of turbulent fluid flow regions along the length of the central longitudinal axis.

7. The solar thermal energy collection system of claim 1, wherein troughs of the second contour define areas of concentrated solar energy.

8. The solar thermal energy collection system of claim 1, wherein the solar thermal energy collection system is a parabolic trough solar energy absorber system, the solar energy concentrator comprises a parabolic reflector having a focal axis that is parallel to a central longitudinal axis of the parabolic reflector and is spaced apart a focal length from a vertex of the parabolic reflector, and the parabolic trough solar energy absorber system further comprises:

a tube into which the absorber pipe is disposed, wherein the outer surface of the absorber pipe is spaced apart from an inner surface of the tube, and a wall of the tube allows for the transmission of radiant energy therethrough, wherein the tube is coupled to the parabolic reflector such that the central longitudinal axis of the absorber pipe is coincident with the focal axis.

9. The solar thermal energy collection system of claim 8, wherein a vacuum condition is maintained between the outer surface of the absorber pipe and the inner surface of the tube.

10. The solar thermal energy collection system of claim 8, further comprising a heat transfer fluid tube coupled to an entry end and an exit end of the absorber pipe, wherein the heat transfer fluid tube and the absorber pipe form a closed loop through which the heat transfer fluid flows.

11. The solar thermal energy collection system of claim 10, further comprising a heat exchanger, wherein at least a portion of the heat transfer fluid tube is disposed inside the heat exchanger.

12. The solar thermal energy collection system of claim 11, wherein the heat exchanger is a boiler tank.

13. The solar thermal energy collection system of claim 10, further comprising a fluid pump coupled to the heat transfer fluid tube, and wherein the fluid pump causes the heat transfer fluid to flow through the heat transfer fluid tube and the absorber pipe.

* * * * *